United States Patent
Takahashi et al.

(10) Patent No.: US 10,170,942 B2
(45) Date of Patent: Jan. 1, 2019

(54) POWER RECEIVING DEVICE AND WIRELESS POWER TRANSMISSION SYSTEM

(71) Applicant: Panasonic Intellectual Property Management Co., Ltd., Osaka (JP)

(72) Inventors: Eiji Takahashi, Nara (JP); Tsutomu Sakata, Osaka (JP); Satoru Kikuchi, Osaka (JP); Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 43 days.

(21) Appl. No.: 15/259,238

(22) Filed: Sep. 8, 2016

(65) Prior Publication Data

US 2017/0098963 A1 Apr. 6, 2017

Related U.S. Application Data

(60) Provisional application No. 62/236,342, filed on Oct. 2, 2015.

(30) Foreign Application Priority Data

Mar. 18, 2016 (JP) .................................. 2016-055569

(51) Int. Cl.
  *H02J 50/12* (2016.01)
  *H02J 7/02* (2016.01)
  (Continued)

(52) U.S. Cl.
  CPC ................ *H02J 50/12* (2016.02); *B60L 1/00* (2013.01); *B60L 11/182* (2013.01); *H02J 7/025* (2013.01);
  (Continued)

(58) Field of Classification Search
  USPC ......................................................... 307/104
  See application file for complete search history.

(56) References Cited

U.S. PATENT DOCUMENTS

| 2011/0208269 A1 | 8/2011 | He et al. |
| 2012/0104867 A1 | 5/2012 | Mudrick et al. |

(Continued)

FOREIGN PATENT DOCUMENTS

| DE | 202010017471 U1 | 2/2012 |
| FR | 3009658 A1 | 2/2015 |
| JP | 2007-336717 | 12/2007 |

OTHER PUBLICATIONS

The Extended European Search Report dated Jan. 30, 2017 for the related European Patent Application No. 16189619.6.

*Primary Examiner* — Rexford Barnie
*Assistant Examiner* — Xuan Ly
(74) *Attorney, Agent, or Firm* — Renner Otto Boiselle & Sklar, LLP

(57) ABSTRACT

A power receiving device includes a power receiving antenna that receives AC power from a power transmitting antenna, a rectifier circuit that converts the AC power into DC power, a detection circuit that detects the DC power, a load driven by the DC power, a battery that charges the DC power, a switching circuit that provides i) connection and disconnection between the rectifier circuit and the load and ii) connection and disconnection between the load and the battery, and a control circuit that controls the power receiving device. The control circuit controls the switching circuit to disconnect the rectifier circuit from the load and connect the load to the battery if the DC power is less than or equal to a power threshold value, and drive the load by the DC power charged in the battery.

7 Claims, 18 Drawing Sheets

(51) Int. Cl.
*H02M 7/537* (2006.01)
*B60L 11/18* (2006.01)
*H02J 50/10* (2016.01)
*H02J 50/20* (2016.01)
*H02J 50/80* (2016.01)
*B60L 1/00* (2006.01)

(52) U.S. Cl.
CPC .............. *H02J 50/10* (2016.02); *H02J 50/20* (2016.02); *H02J 50/80* (2016.02); *H02M 7/537* (2013.01); *B60L 2210/30* (2013.01); *B60L 2210/40* (2013.01)

(56) References Cited

U.S. PATENT DOCUMENTS

| | | | |
|---|---|---|---|
| 2016/0156200 A1* | 6/2016 | Kim | H02J 50/20 307/104 |
| 2016/0197507 A1* | 7/2016 | Blanc | H02J 50/10 307/20 |

* cited by examiner

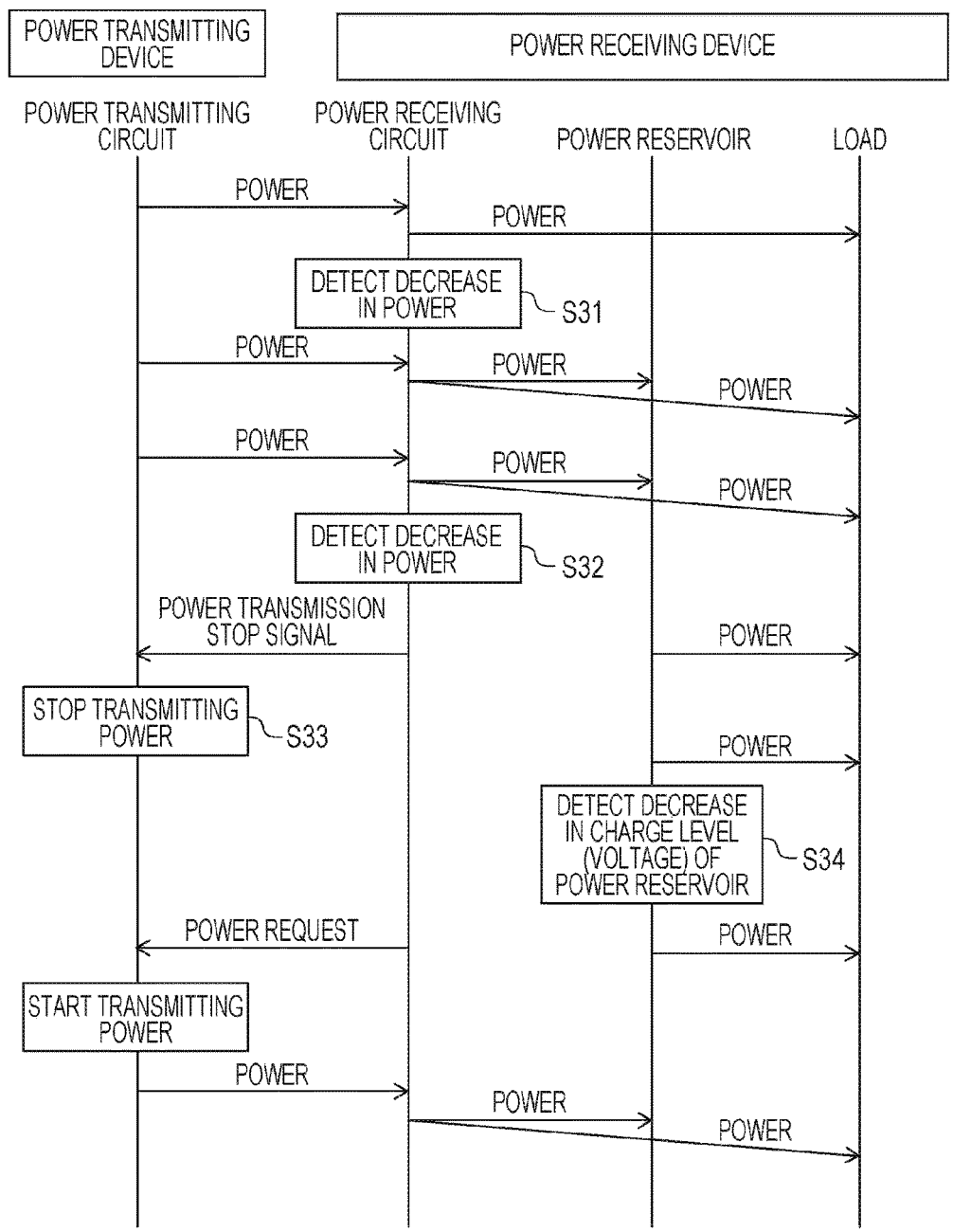

POWER RECEIVING DEVICE AND WIRELESS POWER TRANSMISSION SYSTEM

BACKGROUND

1. Technical Field

The present disclosure relates to a power receiving device for use in a wireless power transmission system that wirelessly transmits power.

2. Description of the Related Art

In recent year, a wireless (noncontact) power transmission technology for wirelessly transmitting power to equipment that changes its position over time, such as cell phones or electric vehicles, has been developed. For example, Japanese Unexamined Patent Application Publication No. 2007-336717 describes a noncontact power transmission system capable of controlling the voltage of the power transmitted wirelessly so that the voltage after rectification is at a constant level.

SUMMARY

In general, existing wireless power transmission systems have low transmitting efficiency during a low load (low power) period, although they have high transmitting efficiency during a heavy load (high power) period. Thus, when the power is supplied to a load during a period during which a low load condition frequently occurs, the power efficiency per time unit decreases, which is problematic.

In one general aspect, the techniques disclosed here feature a power receiving device including: a power receiving antenna that receives AC power from a power transmitting device including a power transmitting antenna that wirelessly transmits the AC power; a rectifier circuit that converts the AC power into DC power; a detection circuit that detects a value of the DC power; a load that is driven by the DC power; a battery that charges the DC power; a switching circuit that provides i) connection and disconnection between the rectifier circuit and the load and ii) connection and disconnection between the load and the battery; and a control circuit that controls the power receiving device, wherein the control circuit controls the switching circuit to connect the rectifier circuit to the load and disconnect the rectifier circuit from the battery and determines whether the value of the DC power detected using the detection circuit is less than or equal to a power threshold value, wherein if the value of the DC power reaches less than or equal to the power threshold value, the control circuit controls the switching circuit to disconnect the rectifier circuit from the load and connect the load to the battery to drive the load using the DC power charged by the battery.

According to an aspect of the disclosure, the load is driven using the battery under a low load condition under which the transmitting efficiency of wireless power transmission is low. Power supply through the wireless power transmission is performed only under a load condition with an efficiency that is higher than or equal to a predetermined value. In this manner, the power efficiency per time unit can be increased.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9B is a sequence diagram illustrating another example of the power transmission control sequence according to the exemplary embodiment;

DETAILED DESCRIPTION

Underlying Knowledge Forming Basis of the Present Disclosure

The underlying knowledge forming basis of the present disclosure is described first before exemplary embodiments of the present disclosure are described.

Figure 1:
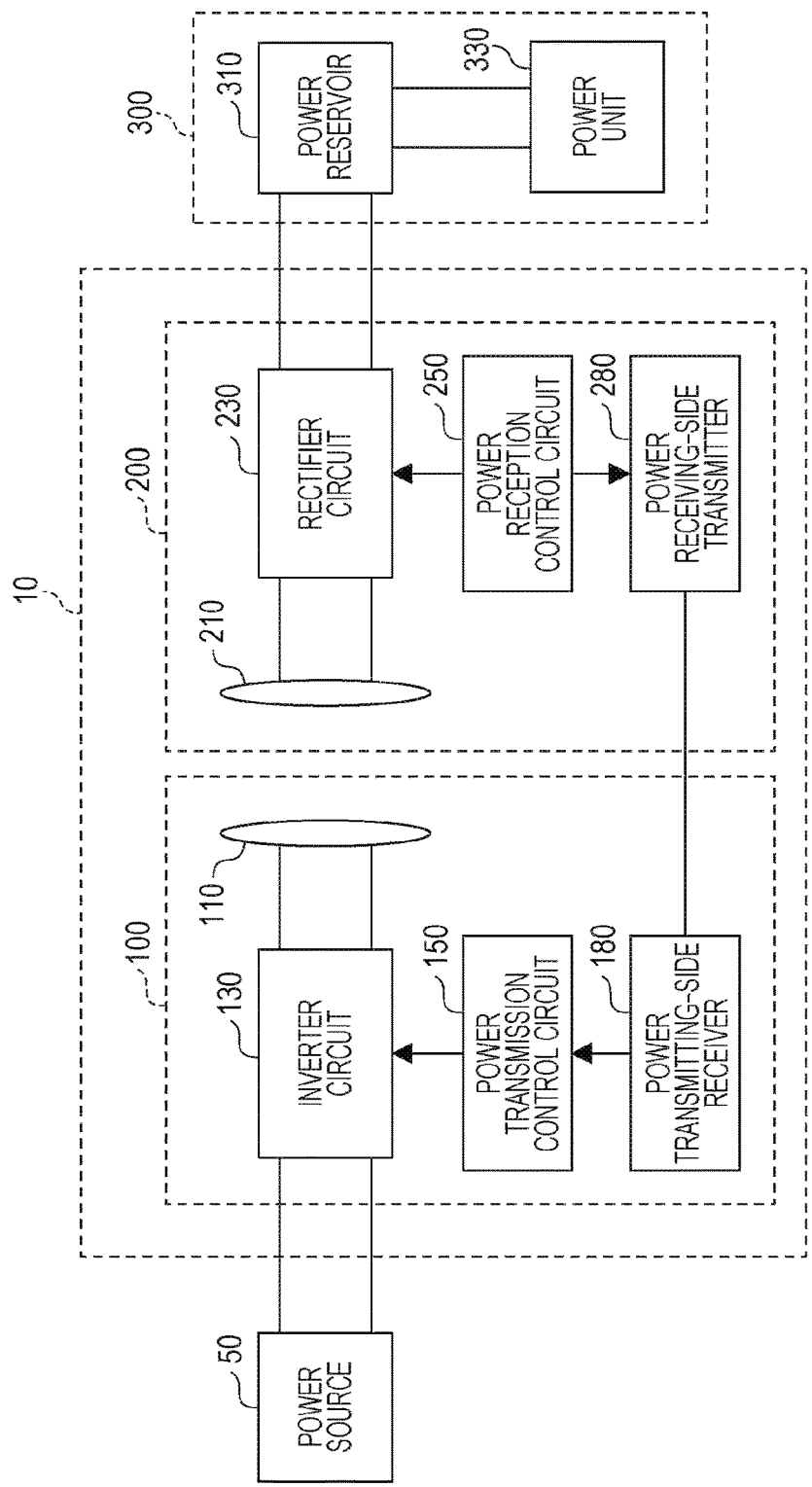
FIG. 1 is a block diagram of an example of the configuration of a wireless power transmission system (a comparative example)

FIG. 1 is a block diagram of an example of the configuration of a wireless power transmission system 10 (a comparative example). The wireless power transmission system 10 includes a power transmitting device 100 and a power receiving device 200. FIG. 1 also illustrates a power source 50 and a load drive device 300, which are not constituent elements of the wireless power transmission system 10 and are disposed outside the wireless power transmission system 10. However, the power source 50 and a load drive 300 may be included in the wireless power transmission system 10.

The power transmitting device 100 includes a power transmitting antenna 110, an inverter circuit 130, a power transmission control circuit 150, and a power transmitting-side receiver 180. The power receiving device 200 includes a power receiving antenna 210, a rectifier circuit (a rectifier) 230, a power reception control circuit 250, and a power receiving-side transmitter 280. The load drive device 300 includes a battery (a power storage device) 310, and a power unit 330.

Each of the power transmitting antenna 110 and the power receiving antenna 210 is an oscillator including a coil and a capacitor. Electric power is wirelessly transmitted using magnetic field coupling between the coil of the power transmitting antenna 110 and the coil of the power receiving antenna 210.

The inverter circuit 130 is connected between the power source 50 and the power transmitting antenna 110. The inverter circuit 130 converts DC power supplied from the power source 50 into AC power and supplies the power to the power transmitting antenna 110. The inverter circuit 130 is controlled by a power transmission control circuit 150.

The rectifier circuit 230 is connected between the power receiving antenna 210 and the battery 310. The rectifier circuit 230 converts the AC power received by the power receiving antenna 210 to DC power and supplies the DC power to the battery 310. The power reception control circuit 250 detects the voltage value of the DC power output from the rectifier circuit 230 and causes the power receiving-side transmitter 280 to transmit the information regarding the voltage value.

The power transmission control circuit 150 controls the voltage of the AC power output from the inverter circuit 130 on the basis of the voltage information regarding the power receiving device 200 received by the power transmitting-side receiver 180. In this manner, feedback control is performed so that the AC voltage supplied to the load drive device 300 is maintained at a constant voltage.

The load drive device 300 includes the battery 310, such as a battery (secondary cell) or a capacitor, and the power unit 330, such as a motor. The battery 310 is charged by the DC power output from the rectifier circuit 230. The power unit 330 is driven using the power stored in the battery 310.

The present inventors have discovered that there is the issue of a decrease in the power transmission efficiency under a low load condition (i.e., under a low power condition). The issue is described in detail below.

Figure 2A:
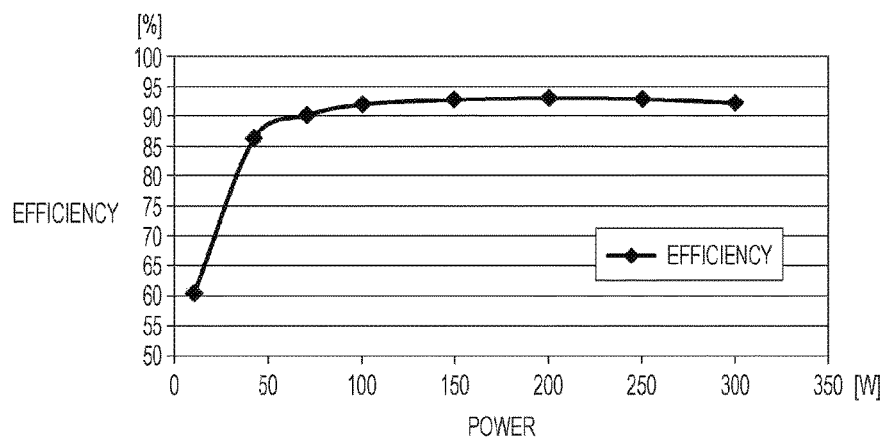
FIG. 2A illustrates an example of the power-efficiency characteristics of wireless power transmission in the widely used configuration like the comparative example.

FIG. 2A illustrates an example of the power-efficiency characteristic of wireless power transmission in a widely used configuration like the above-described comparative example. In general, the design of widely used wireless power transmission systems is such that it can support a low load condition to a high load condition without changing the peak efficiency at a heavy load (high power) time. That is, the impedances of the circuits in the power transmitting device 100 and the power receiving device 200 are set so that the peak efficiency at a heavy load time is as high as possible. As a result, as illustrated in FIG. 2A, in general, the transmitting efficiency is low when the transmitted power is low, although the transmitting efficiency is high when the transmission power is high. Since the efficiency tends to be low when the load is low (under a low power condition), the power efficiency per time unit decreases when the power is supplied to a load (e.g., a motor) having frequent low load states.

Figure 2B:
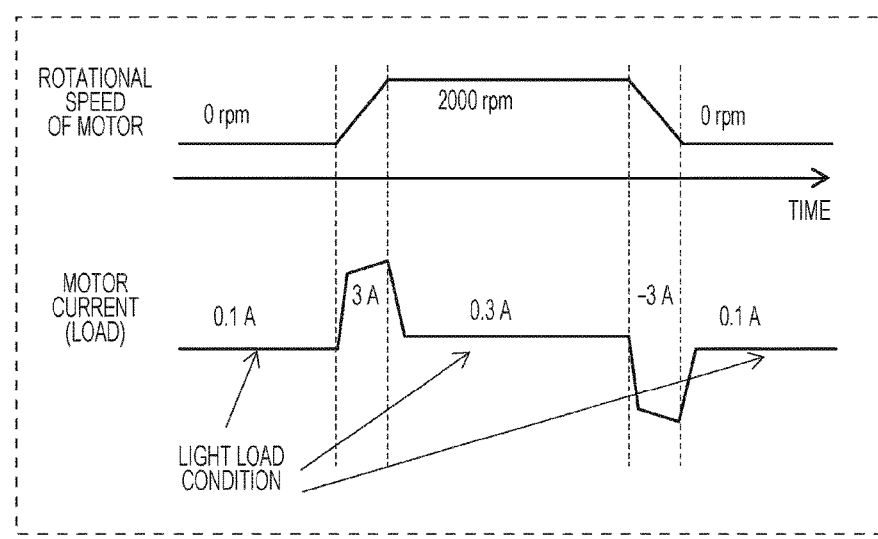
FIG. 2B illustrates an example of a time variation of a rotational speed of a motor and a time variation of the current flowing in the motor when the load is the motor.

FIG. 2B illustrates an example of a time variation of the rotational speed of a motor that serves as a load and a time variation of the electric current flowing in the motor. In general, when a motor serves as the load, a period of time during which the rotational speed of the motor is maintained at a constant value, that is, the period of time during which the motor generates low torque (a low load period) is long, as illustrated in FIG. 2B. Accordingly, a low load condition that decreases the electrical current flowing in the motor frequently occurs. In such a case, since the condition under which the transmitting efficiency of the wireless power transmission system is low continues for a long time, the power efficiency per time unit decreases.

The present inventors discovered the above-described issue and have studied the configurations that address the issue. Finally, the present inventors found that the above-described issue was able to be addressed by appropriately changing the switching states among the rectifier circuit, the capacitor, and the load in accordance with the amount of the load driven (or the power).

Through the above-described studies, the present inventors conceived the idea of the aspects disclosed below.

According to an aspect of the present disclosure, a power receiving device includes a power receiving antenna that receives AC power from a power transmitting device including a power transmitting antenna that wirelessly transmits the AC power;

a rectifier circuit that converts the AC power into DC power;

a detection circuit that detects a value of the DC power;

a load that is driven by the DC power;

a battery that charges the DC power;

a switching circuit that provides i) connection and disconnection between the rectifier circuit and the load and ii) connection and disconnection between the load and the battery; and a control circuit that controls the power receiving device, wherein the control circuit controls the switching circuit to connect the rectifier circuit to the load and disconnect the rectifier circuit from the battery and determines whether the value of the DC power detected using the detection circuit is less than or equal to a power threshold value, wherein if the value of the DC power reaches less than or equal to the power threshold value, the control circuit controls the switching circuit to disconnect the rectifier circuit from the load and connect the load to the battery to drive the load using the DC power charged by the battery.

According to the above-described aspect, the control circuit creates a mode in which the rectifier circuit is connected to the load and the rectifier circuit is not connected to (is disconnected from) the battery first. In this manner, the control circuit creates a mode in which the DC power is supplied from the rectifier circuit to the load. In this mode, the control circuit determines whether the value of the DC power detected using the detection circuit is less than or equal to a predetermined threshold value (a power threshold value). If the value of the DC power reaches a value less than or equal to the power threshold value, the control circuit determines that the AC power that is greater than or equal to a predetermined value is not required for driving the load and controls the switching circuit so that that the rectifier circuit is disconnected from the load and the load is connected to the battery. Thereafter, the control circuit drives the load using the DC power charged in the battery.

In this manner, under a low power condition, power supply from the rectifier circuit to the load is stopped, and power supply from the battery to the load is started. As a result, power supply through the wireless power transmission under a low power condition with low efficiency can be avoided and, thus, the efficiency of the entire system can be increased.

According to the above-described aspect, the load includes, for example, a motor. The condition that the AC power that is greater than or equal to a predetermined value is not required for driving the load includes the condition that a variation of a rotational speed of the motor is within a predetermined range for a predetermined period of time or the condition that the motor is maintained in a stopped condition.

According to another aspect of the present disclosure, a power receiving includes a power receiving antenna that receives AC power from a power transmitting device including a power transmitting antenna that wirelessly transmits the AC power, a rectifier circuit that converts the AC power into DC power, a first detection circuit that detects a value of the DC power, a load that is driven by the DC power, a battery that charges the DC power, a second detection circuit that detects a charge level of the battery, a switching circuit that provides i) connection and disconnection between the rectifier circuit and the load, ii) connection and disconnection between the rectifier circuit and the battery, and iii) connection and disconnection between the load and the battery, and a control circuit that controls the power receiving device.

The control circuit connects the rectifier circuit to the load, disconnects the rectifier circuit from the battery, and disconnects the load from the battery.

The control circuits determines whether the value of the DC power detected using the first detection circuit is less than or equal to a power threshold value.

If the value of the DC power reaches a value less than or equal to the power threshold value, the control circuit controls the switching circuit to connect the rectifier circuit to the load, connect the rectifier circuit to the battery, and connect the load to the battery.

If the charge level of the battery is greater than or equal to a first charge level threshold value, the control circuit controls the switching circuit so that the rectifier circuit is disconnected from the load, the rectifier circuit is disconnected from the battery, and the load is connected to the battery, and the load is driven by the DC power charged in the battery.

According to the above-described aspect, the control circuit connects the rectifier circuit to the load, disconnects the rectifier circuit from the battery, and disconnects the load from the battery first. In this manner, the control circuit creates a mode in which the DC power is supplied from the rectifier circuit to the load. In this mode, the control circuits determines whether the value of the DC power detected using the first detection circuit is less than or equal to a power threshold value. If the value of the DC power reaches a value less than or equal to the power threshold value, the control circuit determines that the AC power that is greater than or equal to a predetermined value is not required for driving the load and controls the switching circuit so that the rectifier circuit is connected to the load, the rectifier circuit is connected to the battery, and the load is connected to the battery. That is, under a low power condition, the power is supplied from the rectifier circuit to the battery (the battery is charged) in addition to the load. Furthermore, the power is supplied from the battery to the load.

In addition, if the charge level of the battery is greater than or equal to a first charge level threshold value, the control circuit controls the switching circuit so that the rectifier circuit is disconnected from the load, the rectifier circuit is disconnected from the battery, and the load is connected to the battery. As a result, the power supply from the rectifier circuit to the load and charging of the battery are stopped, and the load is driven by the DC power charged in the battery.

In this manner, under a low power condition, the battery is charged. In addition, if the charge level of the battery is sufficient, the power supply from the rectifier circuit to the load and the battery can be stopped, and the power can be supplied from the battery to the load. As a result, power supply through the wireless power transmission under a low power condition with low efficiency can be avoided and, thus, the efficiency of the entire system can be increased.

Note that the phrase "the charge level of the battery is greater than or equal to the first charge level threshold value" is equivalent to the phrase "the voltage of the battery is greater than or equal to a predetermined threshold value (a first voltage threshold value)". The voltage of the battery increases with increasing charge level. Accordingly, by determining whether the voltage of the battery is higher than or equal to the first voltage threshold value, it can be determined whether "the charge level of the battery is greater than or equal to the first charge level threshold value".

According to the above-described aspect, if the charge level of the battery is not greater than or equal to the first charge level threshold value (i.e., the charge level is insufficient), the control circuit may control the switching circuit so that the rectifier circuit is disconnected from the load, the rectifier circuit is connected to the battery, and the load is disconnected from the battery. Thus, the DC power from the rectifier circuit may be charged in the battery.

In this manner, if the charge level of the battery is insufficient, the power supply from the rectifier circuit to the load and the power supply from the battery to the load are stopped. Thus, power supply from the rectifier circuit to the battery (charging) can have priority over other power supply.

Alternatively, if the charge level of the battery is not greater than or equal to the first charge level threshold value, the control circuit may control the switching circuit so that the rectifier circuit is connected to the load and the rectifier circuit is connected to the battery, and the DC power from the rectifier circuit may be charged in the battery.

In this manner, if the charge level of the battery is insufficient, the power is not supplied from the battery to the load. The battery is charged using the DC power from the rectifier circuit, and the power is supplied to the load.

Alternatively, if the charge level of the battery reaches a value less than or equal to a second charge level threshold value after supply of the DC power from the battery to the load is started, the control circuit may connect the rectifier circuit to the load and connect the rectifier circuit to the battery so that the DC power from the rectifier circuit is supplied to the load. Thus, the DC power from the rectifier circuit may be charged in the battery. For example, the second charge level threshold value may be less than or equal to the first charge level threshold value.

In this manner, if the charge level of the battery decreases after supply of the DC power from the battery to the load is started, the power supply from the battery to the load is stopped. Instead, power supply from the rectifier circuit to the load and the battery (charging) is started. Thus, the mode in which the power is supplied from the battery to the load and the mode in which the battery is charged can be switched in accordance with the charge level.

Note that the phrase "the charge level of the battery is greater than or equal to the second charge level threshold value" is equivalent to the phrase "the voltage of the battery is greater than or equal to a predetermined threshold value (a second voltage threshold value)". By determining whether the voltage of the battery is higher than or equal to the second voltage threshold value, it can be determined whether "the charge level of the battery is greater than or equal to the second charge level threshold value".

According to still another aspect of the present disclosure, a power receiving device includes a power receiving antenna that receives AC power from a power transmitting device including a power transmitting antenna that wirelessly transmits the AC power, a rectifier circuit that converts the AC power into DC power, a detection circuit that detects a value of the DC power, a load that is driven by the DC power, a battery that charges the DC power, a switching circuit that provides connection and disconnection between the load and the battery, and a control circuit that controls the power receiving device.

The control circuit controls the switching circuit to disconnect the load from the battery to supply the DC power from the rectifier circuit to the load and determines whether a value of the DC power detected using the detection circuit is less than or equal to a threshold value in the mode.

If the value of the DC power reaches a value less than or equal to the threshold value, the control circuit determines that the AC power that is greater than or equal to a predetermined value is not required for driving the load and controls the switching circuit to connect the load to the battery.

The control circuit transmits, to the power transmitting device, a power transmission stop signal to stop transmission of the AC power from the power transmitting device to the power receiving device, and the load is driven by the DC power charged in the battery.

According to the aspect, the control circuit disconnects the load from the battery to create a mode in which the DC power is supplied from the rectifier circuit to the load first and, thereafter, determines whether a value of the DC power detected using the detection circuit is less than or equal to a threshold value in the mode. Subsequently, if the value of the DC power reaches a value less than or equal to the threshold value, the control circuit determines that the AC power that is greater than or equal to a predetermined value is not required for driving the load and controls the switching circuit so that the load is connected to the battery. The control circuit sends, to the power transmitting device, a power transmission stop signal to stop transmission of the AC power from the power transmitting device to the power receiving device. Thus, the load is driven by the DC power charged in the battery. Upon receiving the power transmission stop signal, the power transmission control circuit of the power transmitting device stops transmitting the power using an inverter circuit.

In this manner, if a low power condition occurs, the power transmission can be stopped and power supply from the battery to the load can be started. As a result, power supply through the wireless power transmission with low efficiency under low power condition can be avoided and, thus, the efficiency of the entire system can be improved.

According to yet still another aspect of the present disclosure, a power receiving device includes a power receiving antenna that receives AC power from a power transmitting device including a power transmitting antenna that wirelessly transmits the AC power, a rectifier circuit that converts the AC power into DC power, a first detection circuit that detects a value of the DC power, a load that is driven by the DC power, a battery that charges the DC power, a second detection circuit that detects a charge level of the battery, a switching circuit that provides connection and disconnection between the load and the battery, and a control circuit that controls the power receiving device.

The control circuit controls the switching circuit to disconnect the load from the battery to supply the DC power from the rectifier circuit to the load and determines whether the value of the DC power detected using the first detection circuit is less than or equal to a threshold value in the mode.

If the value of the DC power reaches a value less than or equal to the threshold value, the control circuit determines that the AC power that is greater than or equal to a predetermined value is not required for driving the load and controls the switching circuit to connect t the load to the battery, and the control circuit transmits, to the power transmitting device, a power transmission stop signal to stop transmission of the AC power from the power transmitting device to the power receiving device.

If the battery has a charge level greater than or equal to a predetermined value, the load is driven by the DC power charged in the battery.

According to the aspect, the control circuit disconnects the load from the battery to create a mode in which the DC power is supplied from the rectifier circuit to the load first and, thereafter, determines whether the value of the DC power detected using the first detection circuit is less than or equal to a threshold value in the mode. If the value of the DC power reaches a value less than or equal to the threshold value, the control circuit determines that the AC power that is greater than or equal to a predetermined value is not required for driving the load and controls the switching circuit so that the load is connected to the battery, and the control circuit sends, to the power transmitting device, a power transmission stop signal to stop transmission of the AC power from the power transmitting device to the power receiving device. If the battery has a charge level greater than or equal to a predetermined value, the load is driven by the DC power charged in the battery.

That is, if a low power condition occurs, the control circuit connects the load to the battery and sends the power transmission stop signal to the power transmitting device. Upon receiving the power transmission stop signal, the power transmission control circuit of the power transmitting device stops transmitting the power using the inverter circuit. In addition, if the charge level of the battery is greater than or equal to the predetermined value, the power is supplied from the battery to the load. In this manner, power supply through the wireless power transmission with low efficiency under a low power condition can be avoided, and power can be supplied from the battery to the load when the charge level of the battery is sufficient.

According to yet still another aspect of the present disclosure, a power receiving device includes a power receiving antenna that receives AC power from a power transmitting device including a power transmitting antenna that wirelessly transmits the AC power, a rectifier circuit that converts the AC power into DC power, a first detection circuit that detects a value of the DC power, a load that is driven by the DC power, a battery that charges the DC power, a second detection circuit that detects a charge level of the battery, a switching circuit that provides connection and disconnection between the load and the battery, and a control circuit that controls the power receiving device.

The control circuit controls the switching circuit to disconnect the load from the battery to supply the DC power from the rectifier circuit to the load and determines whether the value of the DC power detected using the first detection circuit is less than or equal to a threshold value in the mode.

If the value of the DC power reaches a value less than or equal to the threshold value, the control circuit determines that the AC power that is greater than or equal to a predetermined value is not required for driving the load.

If the battery has a charge level greater than or equal to a predetermined value, the control circuit controls the switching circuit to connect the load to the battery, and the control circuit transmits, to the power transmitting device, a power transmission stop signal to stop transmission of the AC power from the power transmitting device to the power receiving device, and drive the load by the DC power charged in the battery.

According to the aspect, the control circuit disconnects the load from the battery to create a mode in which the DC power is supplied from the rectifier circuit to the load first and, thereafter, determines whether the value of the DC power detected using the first detection circuit is less than or equal to a threshold value in the mode. If the value of the DC power reaches a value less than or equal to the threshold value, the control circuit determines that the AC power that is greater than or equal to a predetermined value is not required for driving the load. In addition, if the battery has a charge level greater than or equal to a predetermined value, the control circuit controls the switching circuit so that the load is connected to the battery, and the control circuit sends, to the power transmitting device, a power transmission stop signal to stop transmission of the AC power from the power transmitting device to the power receiving device. Thus, the load is driven by the DC power charged in the battery.

That is, if a low power condition occurs and, in addition, the charge level of the battery is sufficiently high, the load is connected to the battery. In addition, the power transmission stop signal is sent to the power transmitting device, and power supply from the battery to the load is started. In this manner, power supply through the wireless power transmission with low efficiency under a low power condition can be avoided, and power supply from the battery to the load with relatively high efficiency is started.

As described above, if the magnitude of the load that is driven decreases to a value less than or equal to the predetermined value, the wireless power transmission system according to the present disclosure connects the battery to the power receiving circuit as a power storage load. Thus, charging is performed at the same time. If the total load formed from drive load and power storage load decreases to a predetermined value as charging of the battery progresses, the power transmission is stopped. Alternatively, the total load or part of the load is disconnected from the rectifier circuit and, thus, the power is supplied from the battery to the load.

In this manner, under a load condition that decreases the transmitting efficiency of the wireless power transmission decreases, the load is driven by the battery. Thus, power supply through the wireless power transmission is performed only under a load condition that is higher than or equal to a predetermined value so that the efficiency becomes higher. As a result, the power efficiency per time unit can be increased.

Exemplary embodiments of the present disclosure are described in detail below. Note that the description that is more detailed than necessary may not be given. For example, detailed description of already well known information may be eliminated, and the description of a configuration substantially the same as a configuration described before may not be repeated. This is intended to avoid the following description from being more redundant than necessary and make a person skilled in the art to more easily understand the following description. Note that the present inventors provide the following description and the accompanying drawings for a person skilled in the art to sufficiently understand the present disclosure and do not intend to limit the scope of the claims by the description. In the following description, the same reference numeral is used for the same or similar constituent elements.

As used herein, for ease of understanding, the term "power transmitting-side" is used for a constituent element related to the power transmitting device, and "power receiving-side" is used for a constituent element related to the power receiving device. However, for simplicity, the terms "power transmitting-side" and "power receiving-side" may be eliminated.

First Exemplary Embodiment

Figure 3:
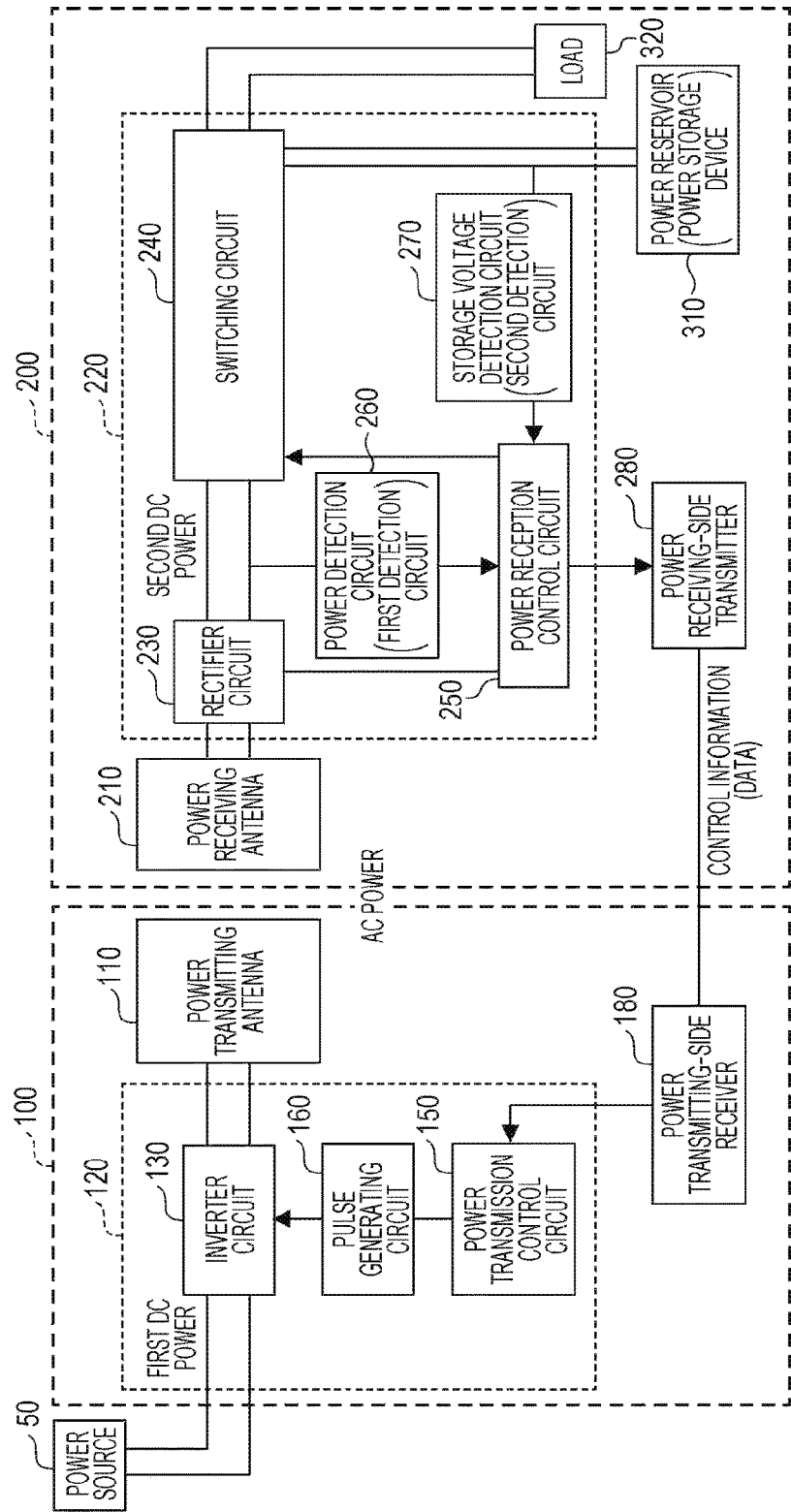
FIG. 3 is a block diagram of the configuration of a wireless power transmission system according to a first exemplary embodiment of the present disclosure.

FIG. 3 is a block diagram of the configuration of a wireless power transmission system according to a first exemplary embodiment of the present disclosure. The wireless power transmission system according to the present exemplary embodiment includes a power transmitting device 100 and a power receiving device 200. FIG. 3 also illustrates a power source 50, which is not a constituent element of the wireless power transmission system and is disposed outside the wireless power transmission system. However, the power source 50 may be included in the wireless power transmission system.

The power transmitting device 100 includes a power transmitting circuit 120 that converts a first direct current (DC) voltage supplied from the power source 50 into alternating current (AC) voltage, a power transmitting antenna 110 that wirelessly transmits the AC power supplied from the power transmitting circuit 120, and a power transmitting-side receiver (a communication circuit) 180 that communicates with the power receiving device 200. The power transmitting circuit 120 includes an inverter circuit 130, a pulse generating circuit 160, and a power transmission control circuit 150. The pulse generating circuit 160 outputs a pulse signal to control a conductive/nonconductive state of each of a plurality of switching elements of the inverter circuit 130. The power transmission control circuit 150 determines the points in time at which the pulse signals are output from the pulse generating circuit 160 and, thus, controls the level of the voltage output from the inverter circuit 130.

The power receiving device 200 includes a power receiving antenna 210 that receives the AC power transmitted from the power transmitting device 100, a power receiving circuit 220, a battery (a power storage device) 310, a load 320, and the power receiving-side transmitter (communication circuit) 280.

The power receiving circuit 220 includes a rectifier circuit 230 that converts the AC power received by the power receiving antenna 210 into second DC power, a power detection circuit (a first detection circuit) 260 that detects the value of second DC power output from the rectifier circuit 230, a storage voltage detection circuit (a second detection circuit) 270 that detects the charge level of the battery 310 by detecting the voltage of the battery 310, a switching circuit 240 that provides electrical connection and disconnection among the rectifier circuit 230, the load 320, and the battery 310, and a power reception control circuit 250 that performs overall control on the operation of the power receiving device 200.

The power receiving device 200 can be an apparatus that operates using electric power, such as an electric vehicle, an automated guided vehicle (AGV), a robot arm apparatus, or a security camera. The battery 310 is a power storage device, such as a battery (a secondary cell) or a capacitor that store the DC power output from the rectifier circuit 230. If a secondary cell is used as the battery 310, any type of secondary cell (e.g., a lithium-ion battery, a nickel hydride battery, or a lead acid battery) can be employed. In contrast, if a capacitor is used as the battery 310, any type of a capacitor (e.g., an electric double-layer capacitor or a lithium-ion capacitor) can be employed. The load 320 is a device driven by the DC power output from the rectifier circuit 230 (e.g., a motor). The load 320 may be a device including a motor (e.g., an actuator mounted in a joint of a robot arm). Alternatively, the load 320 may be a camera or lighting equipment mounted in a rotational portion of a security camera and including an image sensor, such as a CCD.

Figure 4:
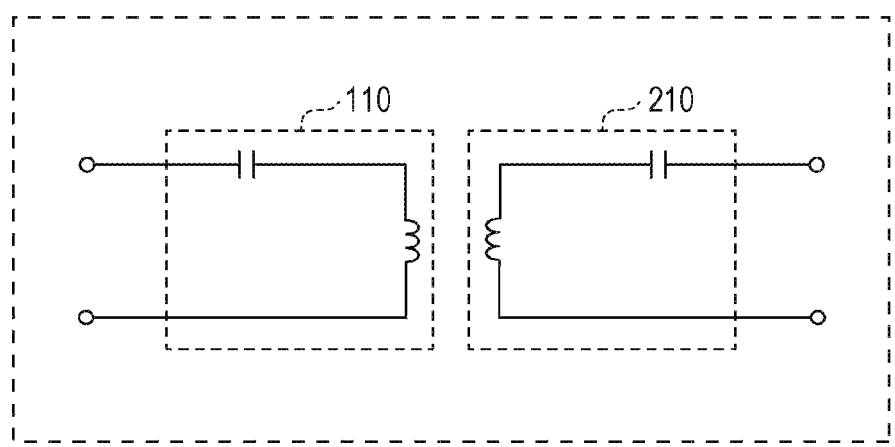
FIG. 4 illustrates an example of the equivalent circuits of a power transmitting antenna and a power receiving antenna each having a configuration of a serial resonance circuit.

Each of the power transmitting antenna 110 and the power receiving antenna 210 can be formed by, for example, a resonance circuit including a coil and a capacitor. FIG. 4 illustrates an example of the equivalent circuits of the power transmitting antenna 110 and the power receiving antenna 210 each having a configuration of a serial resonance circuit. In addition to the example illustrated in FIG. 4, each of the antennae may have a configuration of a parallel resonance circuit. As used herein, a coil in the power transmitting antenna 110 is referred to as a "power transmission coil", and a coil in the power receiving antenna 210 is referred to as a "power reception coil". Power is wirelessly transmitted by inductive coupling (i.e., the magnetic field coupling) between the power transmission coil and the power reception coil. The antennae may have a configuration that wirelessly transmits the power using electric field coupling instead of the magnetic field coupling. In such a case, each of the antennae can include two electrodes, one for power transmission and the other for power reception, and a resonance circuit including an inductor and a capacitor. The power transmitting antenna and the power receiving antenna using the electric field coupling is suitably used for wirelessly transmitting the power to a movable apparatus, such as a delivery robot in a factory.

Each of the power transmission control circuit 150 and the power reception control circuit 250 can be an integrated circuit including a processor and a memory (e.g., a microcontroller). The memory can store a control program (software) that performs the operation described below and a variety of tables. The functions described below are provided by the processor that performs the control program. The power transmission control circuit 150 and the power reception control circuit 250 may be achieved by only hardware without using software.

The pulse generating circuit 160 in the power transmitting circuit 120 is formed from, for example, a gate driver. The pulse generating circuit 160 drives the inverter circuit 130 on the basis of the control signal output from the power transmission control circuit 150 and generates desired AC power.

Figure 5A:
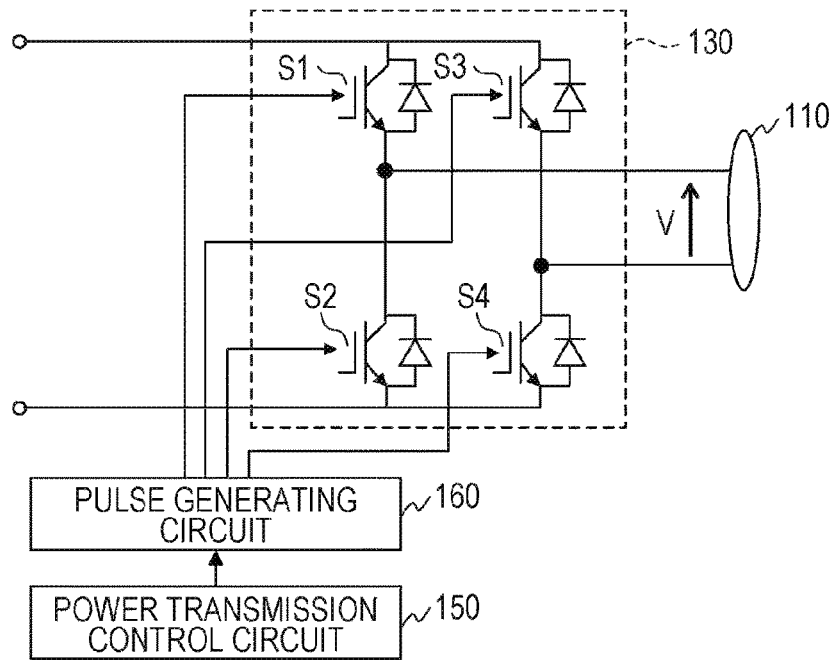
FIG. 5A illustrates an example of the configuration of an inverter circuit.

FIG. 5A illustrates an example of the configuration of the inverter circuit 130. The inverter circuit 130 includes a plurality of switching elements S1 to S4 each switching between its conductive state and its non-conductive state in accordance with the pulse signal supplied from the pulse generating circuit 160. By changing the conductive/nonconductive state of each of the switching elements S1 to S4, the input DC power can be converted into AC power. In the example illustrated in FIG. 5A, a full-bridge inverter circuit including the four switching elements S1 to S4 is used. In this example, each of the switching elements is an Insulated-gate bipolar transistor (IGBT). Instead of employing an IGBT, another type of switching element, such as a metal oxide semiconductor field-effect transistor (MOSFET), may be employed.

In the example illustrated in FIG. 5A, the switching elements S1 and S4 among the switching elements S1 to S4 (a first switching element pair) output a voltage of a polarity that is the same as that of the DC voltage supplied when the switching elements S1 and S4 are in their conductive states. In contrast, the switching elements S2 and S3 (a second switching element pair) output a voltage of a polarity that is opposite to that of the DC voltage supplied when the switching elements S2 and S3 are in their conductive states. The pulse generating circuit 160 supplies a pulse signal to the gate of each of the four switching elements S1 to S4 in accordance with an instruction output from the power transmission control circuit 150. At that time, by controlling the phase difference between two pulse signals supplied to the first switching element pair (the switching elements S1 and S4) and the phase difference between two pulse signals supplied to the second switching element pair (the switching elements S2 and S3), the time-average value of the amplitude of the output voltage can be controlled.

Figure 5B:
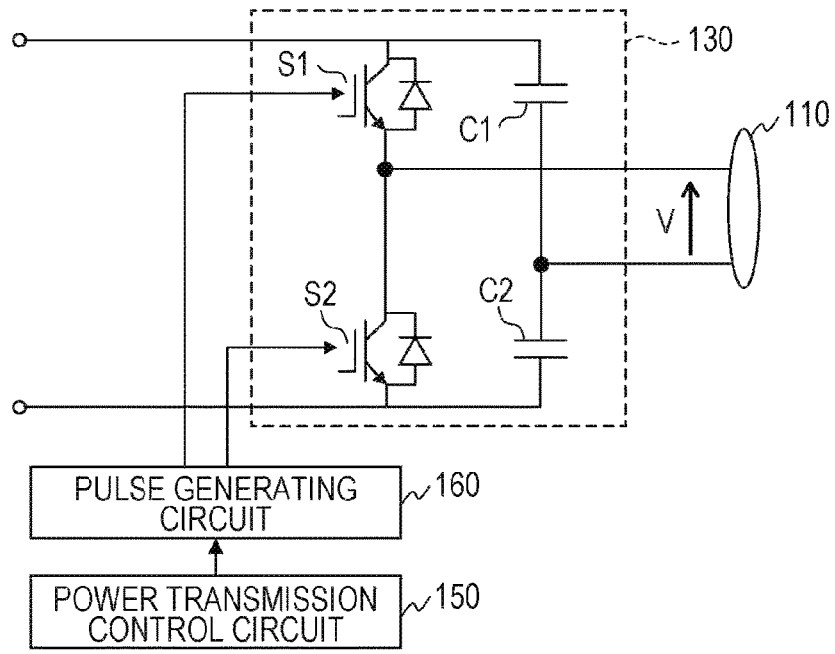
FIG. 5B illustrates another example of the configuration of the inverter circuit.

FIG. 5B illustrates another example of the configuration of the inverter circuit 130. In this example, the inverter circuit 130 is a half-bridge inverter circuit. When a half-bridge inverter circuit is used, the above-described phase control cannot be applied. In such a case, by controlling the duty ratio of the pulse signal input to each of the switching elements, the time-average value of the amplitude of the voltage can be controlled.

The inverter circuit 130 illustrated in FIG. 5B is a half-bridge inverter circuit including two switching elements S1 and S2 and two capacitors C1 and C2. Two switching elements S1 and S2 are connected to two capacitors C1 and C2 in parallel. One end of the power transmitting antenna 110 is connected to a point between the two switching elements S1 and S2, and the other end is connected to a point between the two capacitors C1 and C2.

The power transmission control circuit 150 and the pulse generating circuit 160 supply a pulse signal to each of the switching elements so that the switching element S1 and S2 are alternately turned on. In this manner, the DC power is converted into AC power.

In this example, by controlling the duty ratio of the pulse signal (i.e., the ratio of the ON time to the period), the output time ratio of an output voltage V can be controlled. Thus, the AC power input to a power transmitting antenna 140 can be controlled. The duty control can be applied even when the inverter circuit 130 illustrated in FIG. 5A is used.

The control of the inverter circuit 130 is not limited to the above-described example. For example, another technique of control, such as frequency control, may be employed. By controlling the frequency, the amplitude of the voltage output from the inverter circuit 130 can be also changed.

The power transmitting-side receiver 180 receives data indicating the voltage value of second DC power transmitted from the power receiving-side transmitter 280 (control information). The power transmission control circuit 150 performs feedback control on the basis of the information regarding the voltage value so that a variation of the voltage of the second DC power supplied to the load 320 is reduced. In this manner, the voltage supplied to the load 320 can be maintained at a constant level. Note that such feedback control is not always needed. The feedback control can be employed as needed.

In some example, the power reception control circuit 250 causes the power receiving-side transmitter 280 to send, to the power transmitting-side receiver 180, a power transmission stop signal to stop transmitting the AC power from the power transmitting device 100 to the power receiving device 200 and a power transmission start signal to start transmitting the power. In this case, upon receiving the power transmission start signal, the power transmission control circuit 150 starts transmitting the power using the inverter circuit 130. Upon receiving the power transmission stop signal, the power transmission control circuit 150 stops transmitting the power using the inverter circuit 130.

The communication technique between the power transmitting-side receiver 180 and the power receiving-side transmitter 280 is not limited to a particular technique. Any communication technique can be employed. For example, a wireless communication technique, such as an amplitude modification technique, a frequency modification technique, a wireless LAN, or Zigbee (trade name), can be employed.

The power reception control circuit 250 controls the switching circuit 240 on the basis of the results of detection from the power detection circuit 260 and the storage voltage detection circuit 270, the power supplied to the load 320, and the charge level of the battery 310. Upon receiving the instruction from the power reception control circuit 250, the switching circuit 240 provides connection and disconnection between the rectifier circuit 230 and the battery 310, connection and disconnection between the rectifier circuit 230 and the load 320, and connection and disconnection between the battery 310 and the load 320. According to the present exemplary embodiment, at the time of low power, the power supply from the battery 310 to the load 320 has priority over the power supply to the load 320 through wireless power transmission. In this manner, a decrease in power transmission efficiency at the time of low power can be prevented.

A variety of the configurations of the switching circuit 240 and a variety of control methods for use in the power reception control circuit 250 are provided. Several examples of the configuration of the switching circuit 240 and the control method for use in the power reception control circuit 250 are described below.

Figure 6A:
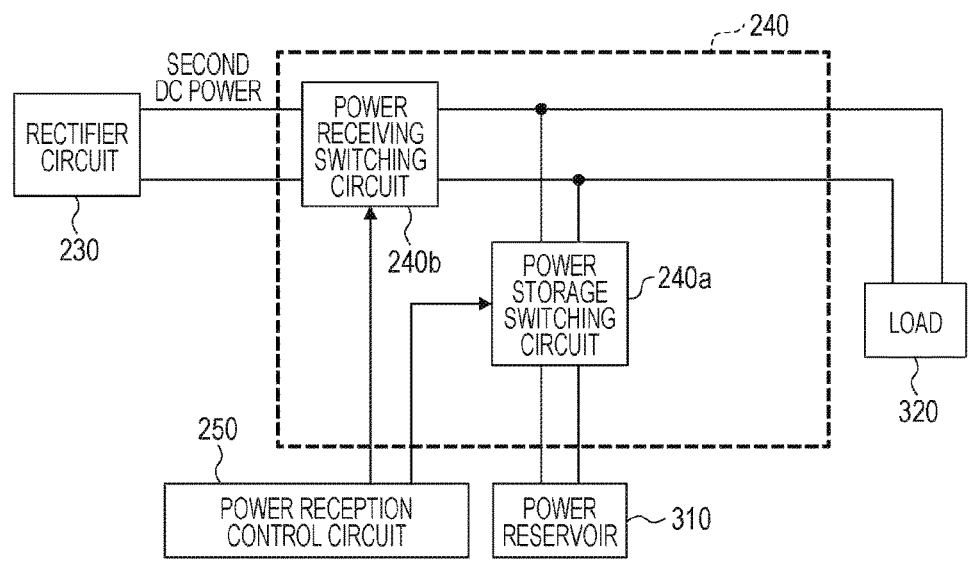
FIG. 6A illustrates a first example of the configuration of a switching circuit.

FIG. 6A illustrates a first example of the configuration of the switching circuit 240. In this example, the switching circuit 240 includes a power receiving switch circuit 240b disposed between the rectifier circuit 230 and the load 320 and a power storage switching circuit 240a disposed between the power receiving switching circuit 240b and the battery 310 and between the battery 310 and the load 320. The power receiving switching circuit 240b is controlled when the connection between the rectifier circuit 230 and the load 320 and the connection between the rectifier circuit 230 and the battery 310 are switched on and off. The power storage switching circuit 240a is controlled when the connection between the rectifier circuit 230 and the battery 310 and the connection between the battery 310 and the load 320 are switched on and off.

Each of the power storage switching circuit 240a and the power receiving switching circuit 240b can be, for example, a semiconductor switch, such as a transistor. Each of the switching circuits is not limited to a semiconductor switch. The switching circuit may be a circuit including any type of switching element. The conductive (connected) state and the nonconductive (disconnected) state of each of the power storage switching circuit 240a and the power receiving switching circuit 240b are controlled by the power reception control circuit 250. Hereinafter, the conductive (connected) state is also referred to as "ON", and the nonconductive (disconnected) state is also referred to as "OFF".

Figure 6B:
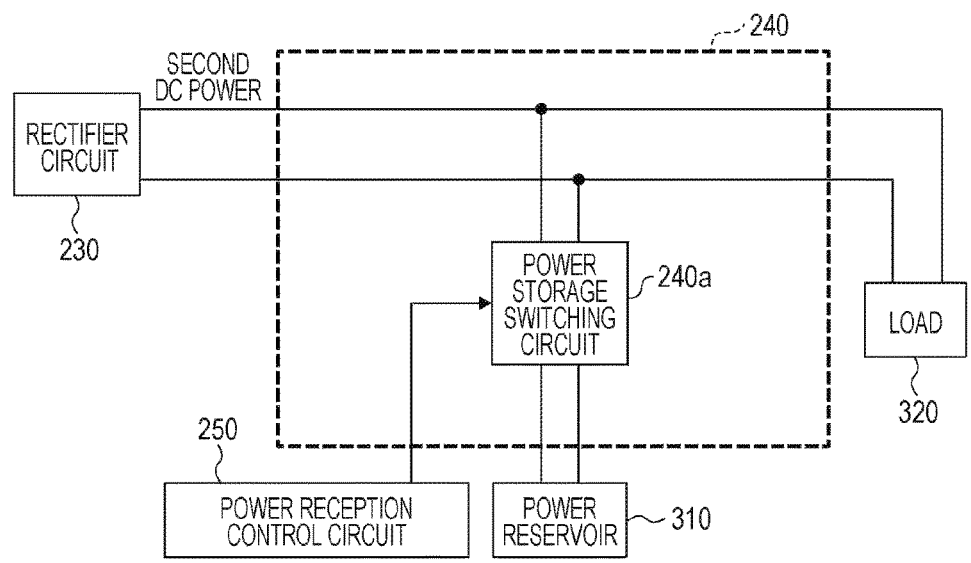
FIG. 6B illustrates a second example of the configuration of the switching circuit.

FIG. 6B illustrates a second example of the configuration of the switching circuit 240. In this example, the switching circuit 240 includes the power storage switching circuit 240a disposed between the rectifier circuit 230 and the battery 310 and between the battery 310 and the load 320. The power storage switching circuit 240a is controlled to control the connection and disconnection between the rectifier circuit 230 and the battery 310 and the connection and disconnection between the battery 310 and the load 320. In this example, the connection and disconnection between the rectifier circuit 230 and the load 320 is controlled by the power reception control circuit 250 that transmits a power transmission stop signal and a power transmission start signal to the power transmitting device 100 via the power receiving-side transmitter 280. In this example, if power supply from the rectifier circuit 230 to the load 320 is stopped, power supply from the rectifier circuit 230 to the battery 310 (i.e., charging) is also stopped.

Figure 6C:
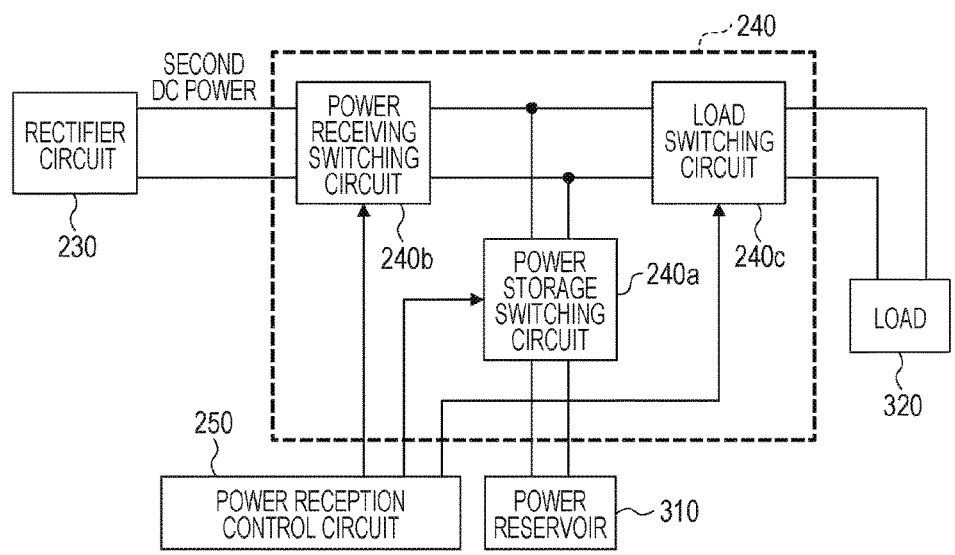
FIG. 6C illustrates a third example of the configuration of the switching circuit.

FIG. 6C illustrates a third example of the configuration of the switching circuit 240. In this example, the switching circuit 240 includes the power storage switching circuit 240a, the power receiving switching circuit 240b, and a load switching circuit 240c. The load switching circuit 240c and the power receiving switching circuit 240*b* are disposed at the same locations as in the example illustrated in FIG. 6A. The load switching circuit 240*c* is disposed between the power receiving switching circuit 240*b* and the load 320 and between the power storage switching circuit 240*a* and the load 320. Like the power storage switching circuits 240*a* and 240*b*, the load switching circuit 240*c* can be a semiconductor switch, such as a transistor. In this example, the power reception control circuit 250 controls the path through which the second DC power is supplied by controlling the connection/disconnection states of the three switch circuits 240*a*, 240*b*, and 240*c*. The load switching circuit 240*c* turns off only when the load 320 is completely OFF (e.g., under the condition that no power supply is required, such as before the load 320 is started).

Figure 6D:
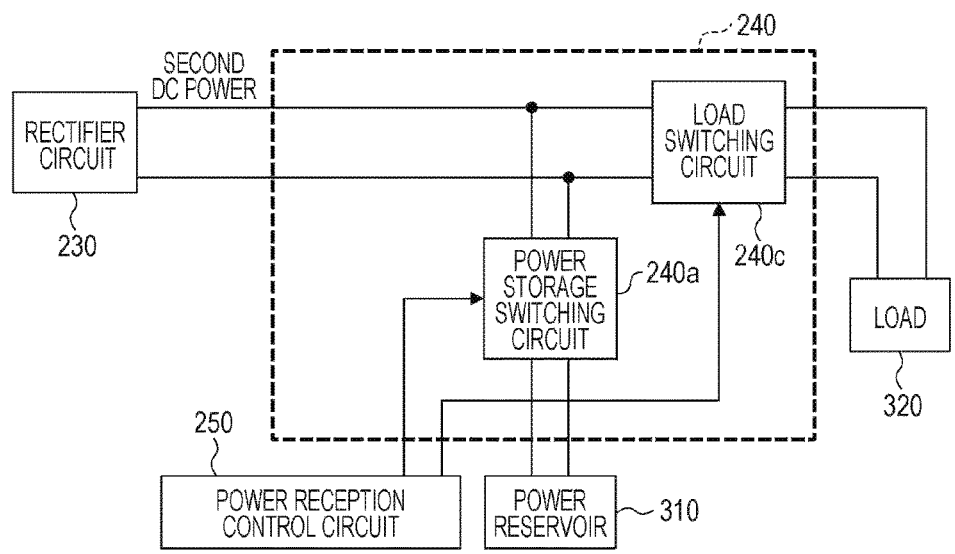
FIG. 6D illustrates a fourth example of the configuration of the switching circuit.

FIG. 6D illustrates a fourth example of the configuration of the switching circuit 240. In this example, the switching circuit 240 includes the power storage switching circuit 240*a* and the load switching circuit 240*c*. The power storage switching circuit 240*a* and the load switching circuit 240*c* are disposed at the same locations as in the example illustrated in FIG. 6C. In this example, the power reception control circuit 250 controls the path through which the second DC power is supplied by controlling the connection/disconnection states of the power storage switching circuits 240*a* and 240*c*. The load switching circuit 240*c* turns off only when the load 320 is completely OFF.

The configuration of the switching circuit 240 is not limited to any one of the illustrated configurations. The switching circuit 240 can have a variety of configurations. For example, the switching circuit 240 may have a configuration in which the rectifier circuit 230 can be connected to the load 320, the rectifier circuit 230 can be connected to the battery 310, and the load 320 can be disconnected to the battery 310. Alternatively, by combining the configurations of the switching circuits 240 illustrated in FIGS. 6A to 6D, a variety of switching control techniques are available.

Several patterns of connection/disconnection among the rectifier circuit 230, the battery 310, and the load 320 are described below.

Figure 7A:
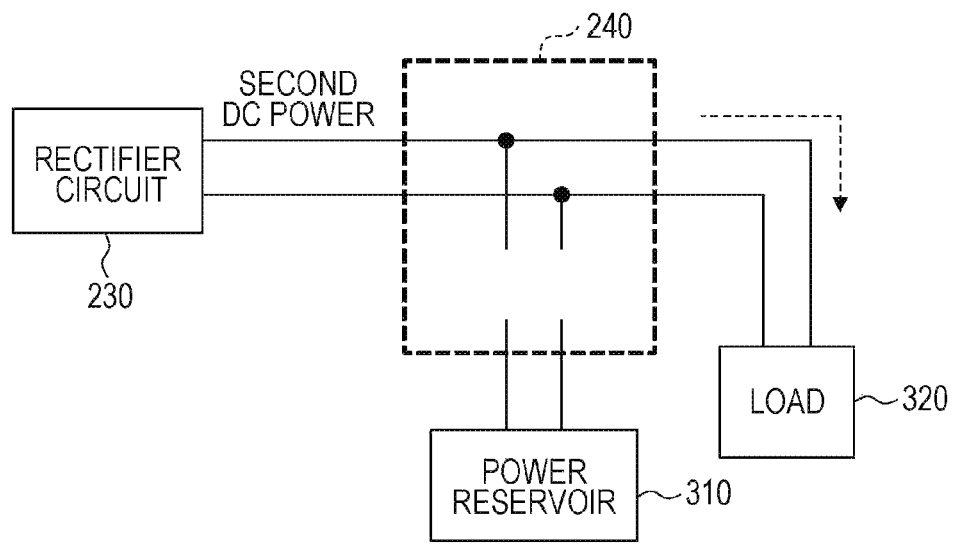
FIG. 7A illustrates a pattern in which a rectifier circuit is connected to a load, the rectifier circuit is disconnected from a battery, and the load is disconnected from the battery.

FIG. 7A illustrates a pattern in which the rectifier circuit 230 is connected to the load 320, the rectifier circuit 230 is disconnected from the battery 310, and the load 320 is disconnected from the battery 310. In this pattern, the power is supplied from the rectifier circuit 230 to the load 320. The power is not supplied from the rectifier circuit 230 to the battery 310 (the battery 310 is not charged). In addition, the power is not supplied from the battery 310 to the load 320. This pattern can be selected when the load 320 consumes the power that is greater than or equal to a predetermined value.

Figure 7B:
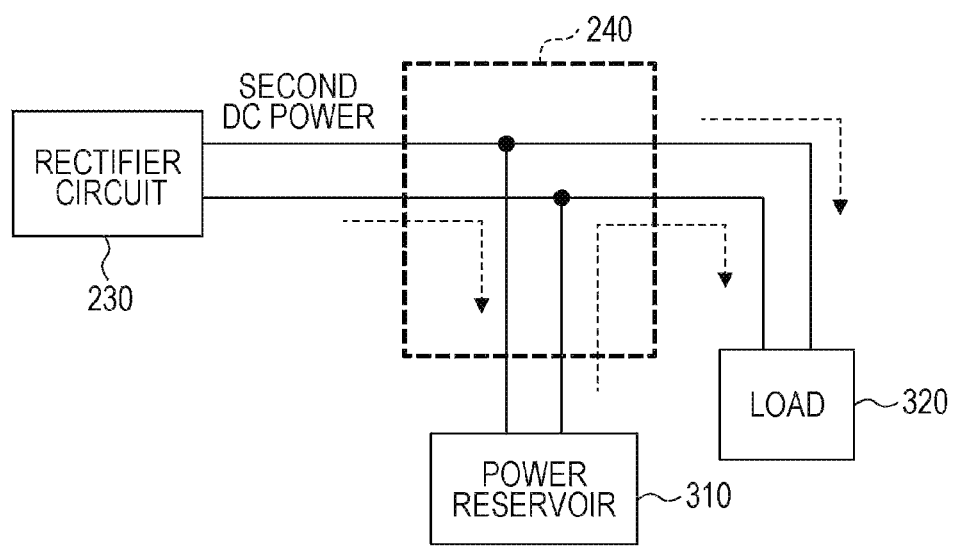
FIG. 7B illustrates a pattern in which the rectifier circuit is connected to the load, the rectifier circuit is connected to the battery, and the load is connected to the battery.

FIG. 7B illustrates a pattern in which the rectifier circuit 230 is connected to the load 320, the rectifier circuit 230 is connected to the battery 310, and the load 320 is connected to the battery 310. If, in this pattern, wireless power transmission is performed, the power is supplied from the rectifier circuit 230 to both the load 320 and the battery 310. This pattern is selected when the power that is greater than or equal to a predetermined value (a power threshold value) due to supplying power to the load 320 and charging of the battery 310. In this pattern, driving of the load 320 and charging of the battery 310 can be performed at the same time. In addition, this pattern can be selected when the wireless power transmission is stopped by the above-described power transmission stop signal and, thus, power is supplied from the battery 310 to the load 320.

Figure 7C:
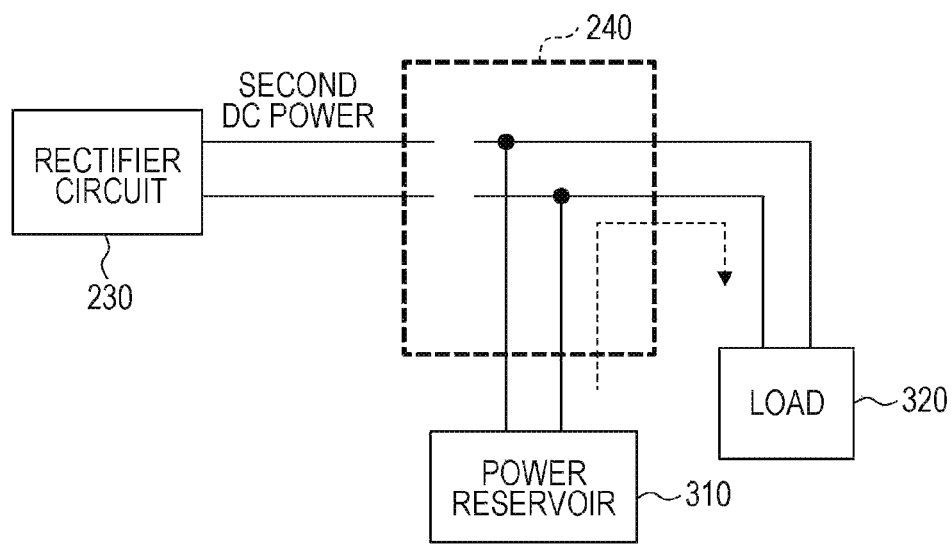
FIG. 7C illustrates a pattern in which the rectifier circuit is disconnected from the load, the rectifier circuit is disconnected from the battery, and the load is connected to the battery.

FIG. 7C illustrates a pattern in which the rectifier circuit 230 is disconnected from the load 320, the rectifier circuit 230 is disconnected from the battery 310, and the load 320 is connected to the battery 310. In this pattern, the power is not supplied to the battery 310 and the load 320 through the wireless power transmission. The power is supplied from the battery 310 to the load 320. The pattern is selected when power that is less than the predetermined value (the power threshold value) is consumed for supplying power to the load 320 and charging the battery 310. As charging of the battery 310 progresses, the power consumed by the battery 310 decreases. After the battery 310 is sufficiently charged, the power is supplied from the battery 310 to the load 320. In this manner, the wireless power transmission under a low load condition that causes low efficiency can be avoided and, thus, the power supply from the battery 310 to the load 320, which is relatively efficient, is performed.

Figure 7D:
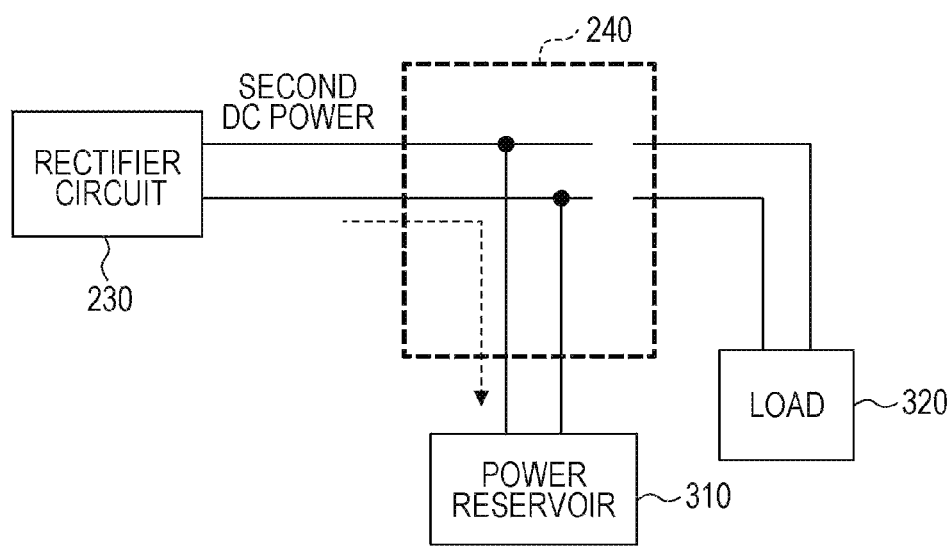
FIG. 7D illustrates a pattern in which the rectifier circuit is disconnected from the load, the rectifier circuit is connected to the battery, and the load is disconnected from the battery.

FIG. 7D illustrates a pattern in which the rectifier circuit 230 is disconnected from the load 320, the rectifier circuit 230 is connected to the battery 310, and the load 320 is disconnected from the battery 310. In this pattern, the power is supplied from the rectifier circuit 230 to the battery 310, and the power is not supplied to the load 320. This pattern is selected when the operation performed by the load 320 is stopped and the battery 310 is charged.

The operation performed in the present exemplary embodiment is described by comparing it to the operation performed in the comparative example.

Figure 8:
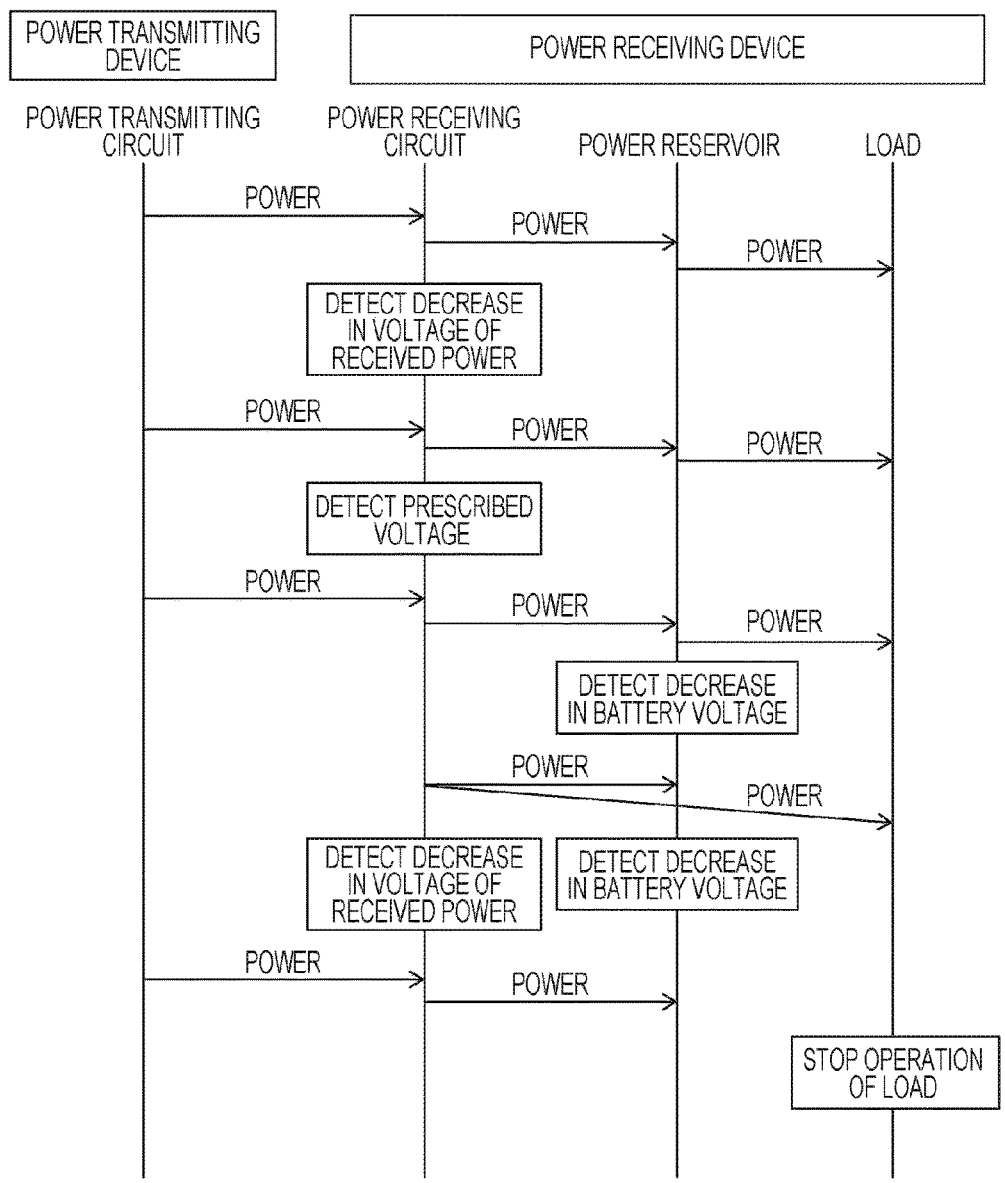
FIG. 8 is a sequence diagram illustrating the power transmission control sequence in the comparative example.

FIG. 8 is a sequence diagram illustrating the power transmission control sequence in the comparative example. In this example, the power receiving circuit 220 basically drives the load 320 via the battery 310 while charging the battery 310 (e.g., a battery). The operation continues even when the power reception control circuit 250 of the power receiving circuit 220 detects a drop of the voltage output from the rectifier circuit 230 (hereinafter, the voltage is also referred to as a "receiving voltage"). If the receiving voltage drops, the inverter circuit 130 is controlled by the power transmission control circuit 150 so that the receiving voltage is close to the prescribed voltage (feedback control). The power receiving circuit 220 continues to drive the load 320 via the battery 310 while charging the battery 310 even after detecting that the receiving voltage goes back to the prescribed voltage. If the voltage of the battery 310 (the charge level) drops, the rectifier circuit 230 of the power receiving circuit 220 directly drives the load 320 and charges the battery 310 using the remaining power. As illustrated in FIG. 8, upon detecting that the voltage of the battery further drops and, thus, the receiving voltage drops, the power reception control circuit 250 charges the battery 310 while supplying the power to the load 320. If the charge level of the battery 310 is recovered, the power reception control circuit 250 drives the load 320 via the battery 310 again.

In the operation performed in the comparative example illustrated in FIG. 8, the load 320 is continuously driven through the wireless power transmission even when the load 320 is in a low load state. As a result, when power is supplied to the load 320, such as a motor, that frequently enters a low load mode, the efficiency of the operation per time unit decreases. Thus, according to the present exemplary embodiment, upon detecting that the load 320 enters a low load mode, the power reception control circuit 250 stops driving the load 320 through the wireless power transmission and starts driving the load 320 using the battery 310. In this manner, the efficiency in a low load mode can be improved and, thus, the efficiency of the entire operation per time unit can be improved.

Figure 9A:
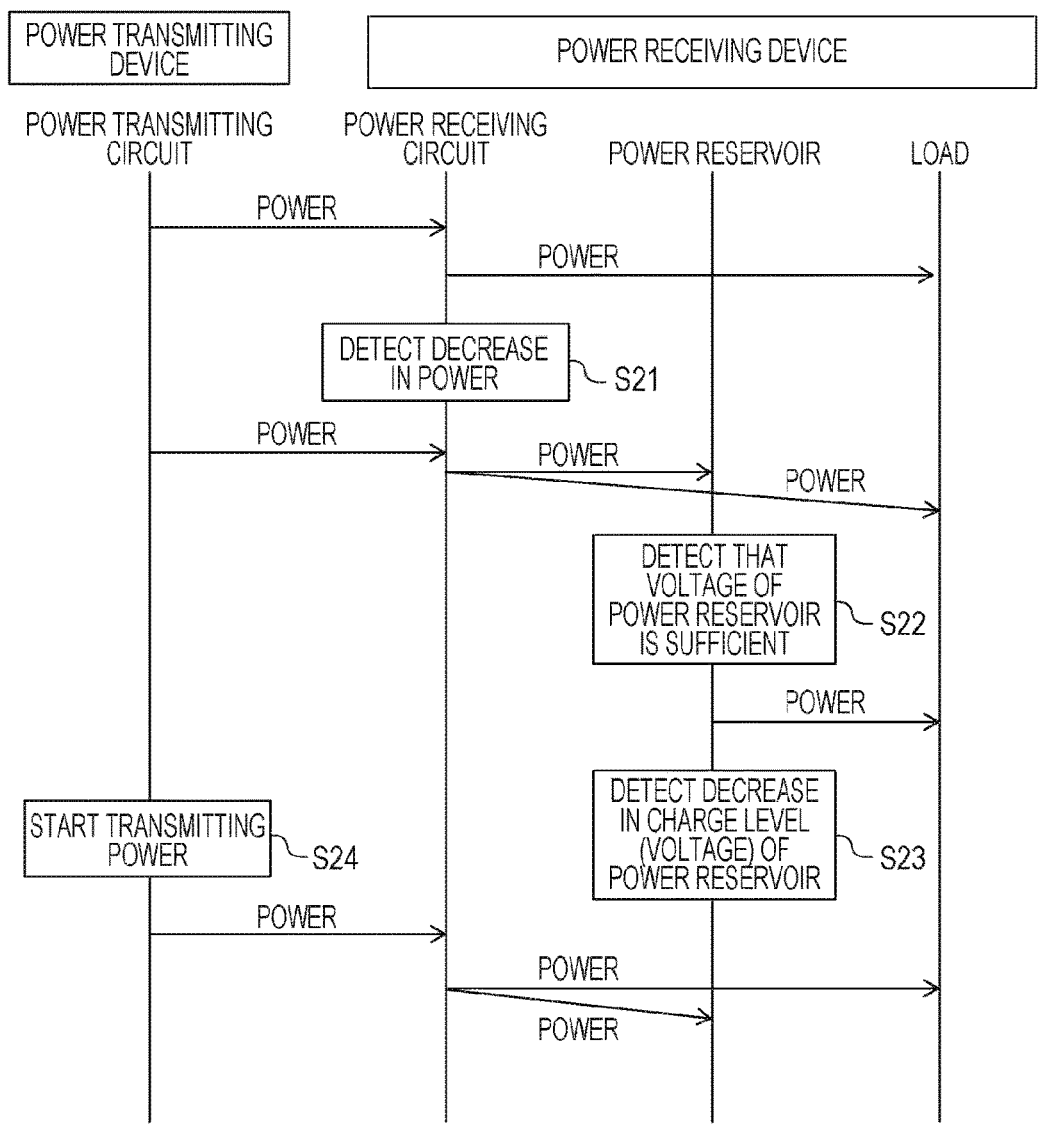
FIG. 9A is a sequence diagram illustrating an example of the power transmission control sequence according to an exemplary embodiment.

FIG. 9A is a sequence diagram illustrating an example of the power transmission control sequence according to the present exemplary embodiment. The power receiving circuit 220 basically drives the load 420 directly using the rectifier circuit 230 and charges the battery 310 using the remaining power. In the example illustrated in FIG. 9A, the power is supplied from the rectifier circuit 230 to the load 420 at first. In addition, no power is supplied to the battery 310. Upon detecting a decrease in the power (step S21), the power reception control circuit 250 connects the rectifier circuit 230 to the battery 310. In this manner, charging of the battery 310 and power supply to the load 320 are performed at the same time. At that time, upon detecting that the voltage of the battery 310 is sufficient (the battery 310 has a charge level greater than or equal to a first charge level threshold value) (step S22), the power reception control circuit 250 controls the switching circuit 240 so that the rectifier circuit 230 is disconnected from the load 320, the rectifier circuit 230 is disconnected from the battery 310, and the load 320 is connected to the battery 310. In this manner, the power reception control circuit 250 drives the load 320 using the DC power charged in the battery 310.

Upon detecting that the charge level (or the voltage) of the battery 310 decreases and, thus, the charge level is less than the first charge level threshold value (step S23), the power reception control circuit 250 controls the switching circuit 240 so that the rectifier circuit 230 is connected to the load 320, the rectifier circuit 230 is connected to the battery 310, and the load 320 is disconnected to the battery 310. In this manner, the power is started to be transmitted again (step S24). The DC power is supplied from the rectifier circuit 230 to the load 320 and the battery 310.

FIG. 9B is a sequence diagram illustrating another example of the power transmission control sequence according to the present exemplary embodiment. In this example, the power receiving circuit 220 basically drives the load 420 using the rectifier circuit 230 directly and charges the battery 310 using the remaining power. At first, the power is supplied from the rectifier circuit 230 to the load 420. In contrast, no power is supplied to the battery 310. Upon detecting a decrease in the power (step S31), the power reception control circuit 250 connects the rectifier circuit 230 to the battery 310 and, thus, charging of the battery 310 and power supply to the load 320 are performed at the same time. Upon detecting a decrease in the power as charging of the battery 310 progresses (step S32), the power reception control circuit 250 sends the power transmission stop signal to the power transmitting device 100 via the power receiving-side transmitter 280. Upon receiving the power transmission stop signal, the power transmission control circuit 150 of the power transmitting device 100 stops the operation performed by the inverter circuit 130 (step S33). That is, if the total load including the load of the battery 310 is less than or equal to a prescribed value (i.e., if the power value is less than or equal to the power threshold value), the power reception control circuit 250 stops power transmission from the rectifier circuit 230 and drives the load 320 using the battery 310.

Thereafter, if the charge level of the battery 310 reaches a value less than or equal to a predetermined threshold value (step S34), the power reception control circuit 250 sends the power transmission start signal to the power transmitting device 100. In this manner, the load 320 is driven using the rectifier circuit 230 again, and the battery 310 is charged using the remaining power.

Subsequently, if the charge level of the battery 310 is recovered and the load 320 is less than the prescribed value, the power transmission is stopped again, and the load 320 is driven via the battery 310.

According to the power transmission control of the present exemplary embodiment, the efficiency per time unit when the transmission power is low can be increased.

Figure 10:
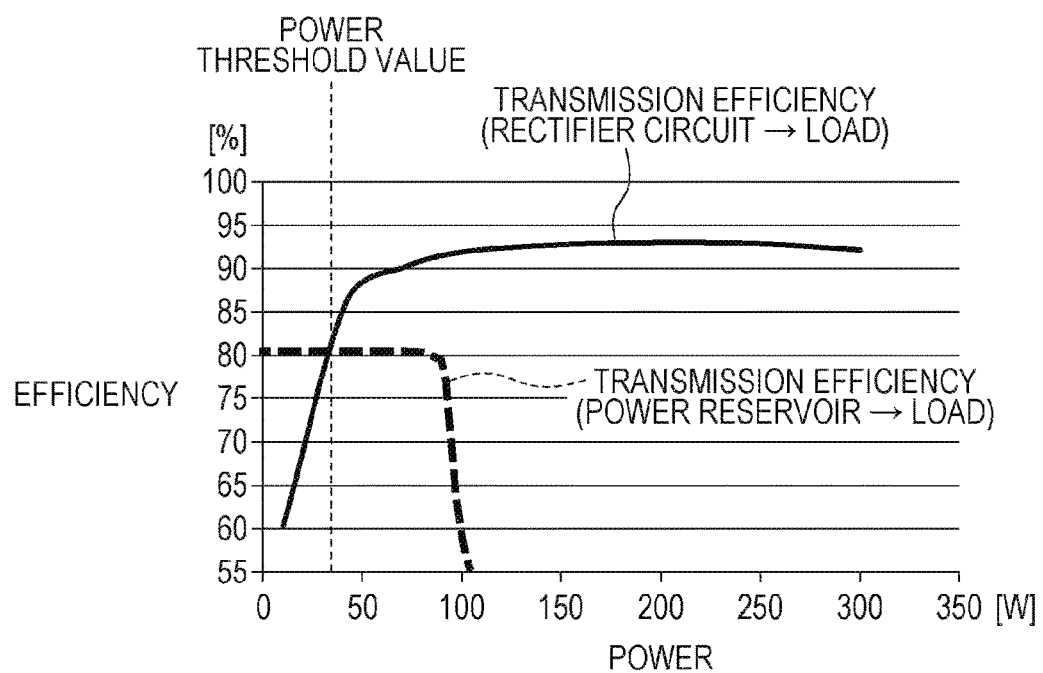
FIG. 10 illustrates an example of the power-efficiency characteristic according to an exemplary embodiment.

FIG. 10 illustrates an example of the power-efficiency characteristic according to the present exemplary embodiment. A solid line indicates the efficiency of power transmission from the rectifier circuit 230. A dashed line indicates the efficiency of power transmission from the battery 310. As can be seen from FIG. 10, the efficiency of power transmission from the rectifier circuit 230 abruptly decreases with decreasing power. In contrast, the efficiency of power transmission from the battery 310 remains unchanged when the power is low and is relatively high. Accordingly, the power threshold value used when the power supply from the rectifier circuit 230 to the load 320 is stopped and power supply from the battery 310 to the load 320 is started can be set to, for example, a power value that allows the efficiency of power transmission from the battery 310 to be higher than the efficiency of power transmission from the rectifier circuit 230. By setting the power threshold value in this manner, a higher one of the power supply from the rectifier circuit 230 and the power supply from the battery 310 can be selected. Accordingly, the efficiency per time unit can be increased more than in existing technologies.

As illustrated in FIG. 2B, when the load 320 is driven at a constant rotational speed for a long time (like a motor), a light load condition frequently occurs in the operation. According to the present exemplary embodiment, to increase the efficiency under the light load condition that frequently occurs, the power supply from the battery 310 has priority over the power supply from the rectifier circuit 230 under the light load condition.

Figure 11:
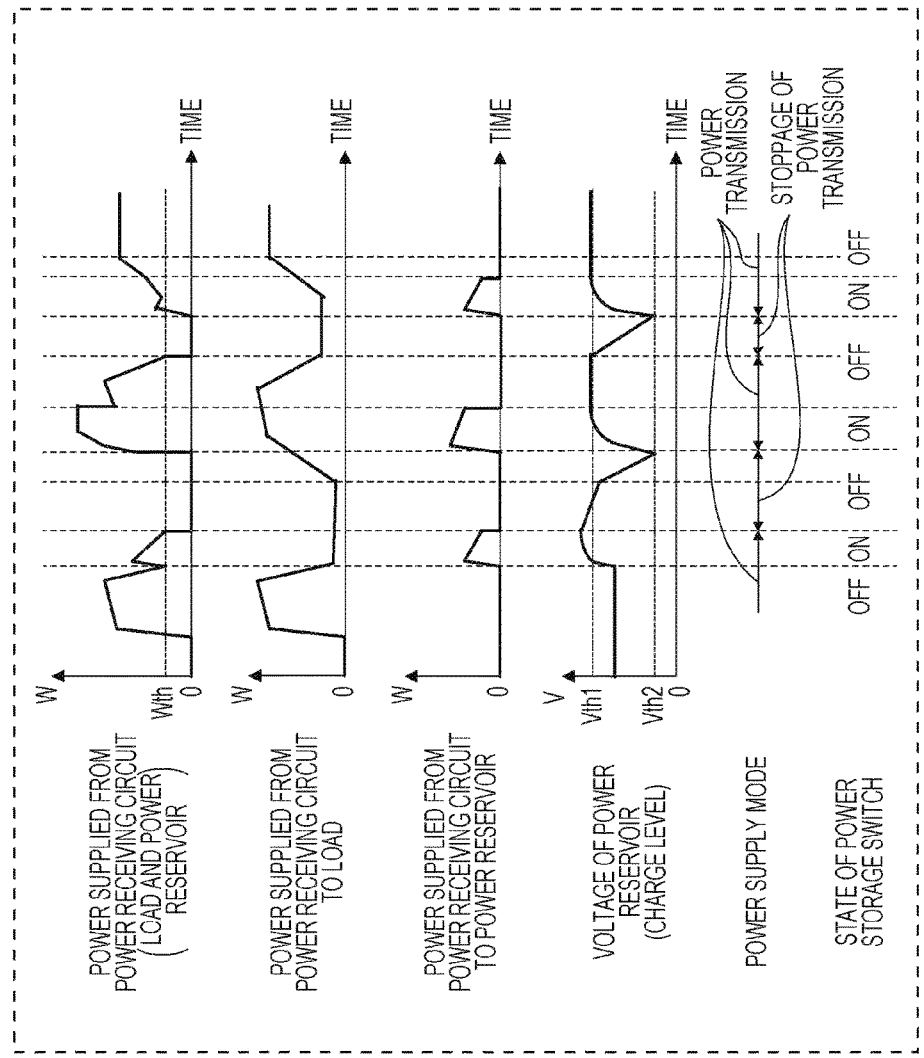
FIG. 11 illustrates an example of the time variations of the power supplied from the power receiving circuit and the voltage (or the charge level) of the battery and an example of the relationship between the power supply mode and the state of a power storage switch at various points in time.

FIG. 11 illustrates an example of the time variations of the power supplied from the power receiving circuit 220 and the voltage (or the charge level) of the battery 310 and an example of the relationship between the power supply mode and the state of a power storage switch at various points in time. As used herein, the term "power transmission" in the power supply mode refers to power supply from the rectifier circuit 230 to one of the load 320 and the battery 310. The term "stoppage of power transmission" refers to a mode in which the power is not supplied from the rectifier circuit 230 to the load 320 or the battery 310. The power supply mode may be switched by the power receiving switching circuit 240b or the load switching circuit 240c illustrated in FIGS. 6A, 6C, and 6D. Alternatively, the power supply mode may be switched by sending the power transmission stop signal and the power transmission start signal to the power transmitting device 100. The terms "ON" and "OFF" of the power storage switch refer to the conductive state and nonconductive state of the power storage switching circuit 240a illustrated in FIGS. 6A to 6D, respectively.

The power supplied from the power receiving circuit 220 is the sum of the power supplied to the load 320 and the power supplied to the battery 310. If the total power is less than or equal to a prescribed value (a power threshold value Wth), the power supply through the wireless power transmission (the power transmission) is stopped. In this manner, low-efficiency power supply under a low load condition can be avoided.

During the stoppage of the power supply through the wireless power transmission, the load 320 is driven using the battery 310. By monitoring the voltage or the charge level of the battery 310, a decrease in the charge level can be detected. If the voltage of the battery 310 decreases and reaches a value less than or equal to a predetermined threshold value (a second voltage threshold value Vth2), power supply through the wireless power transmission is started again to charge the battery 310 (in a high load mode). Note that as described above, the condition that the voltage of the battery 310 reaches a value less than or equal to a predetermined threshold value (the voltage threshold value) is equivalent to the condition that the charge level reaches a value less than or equal to a predetermined threshold value (the charge level threshold value).

A particular example of the operation according to the present exemplary embodiment is described below.

Figure 12:
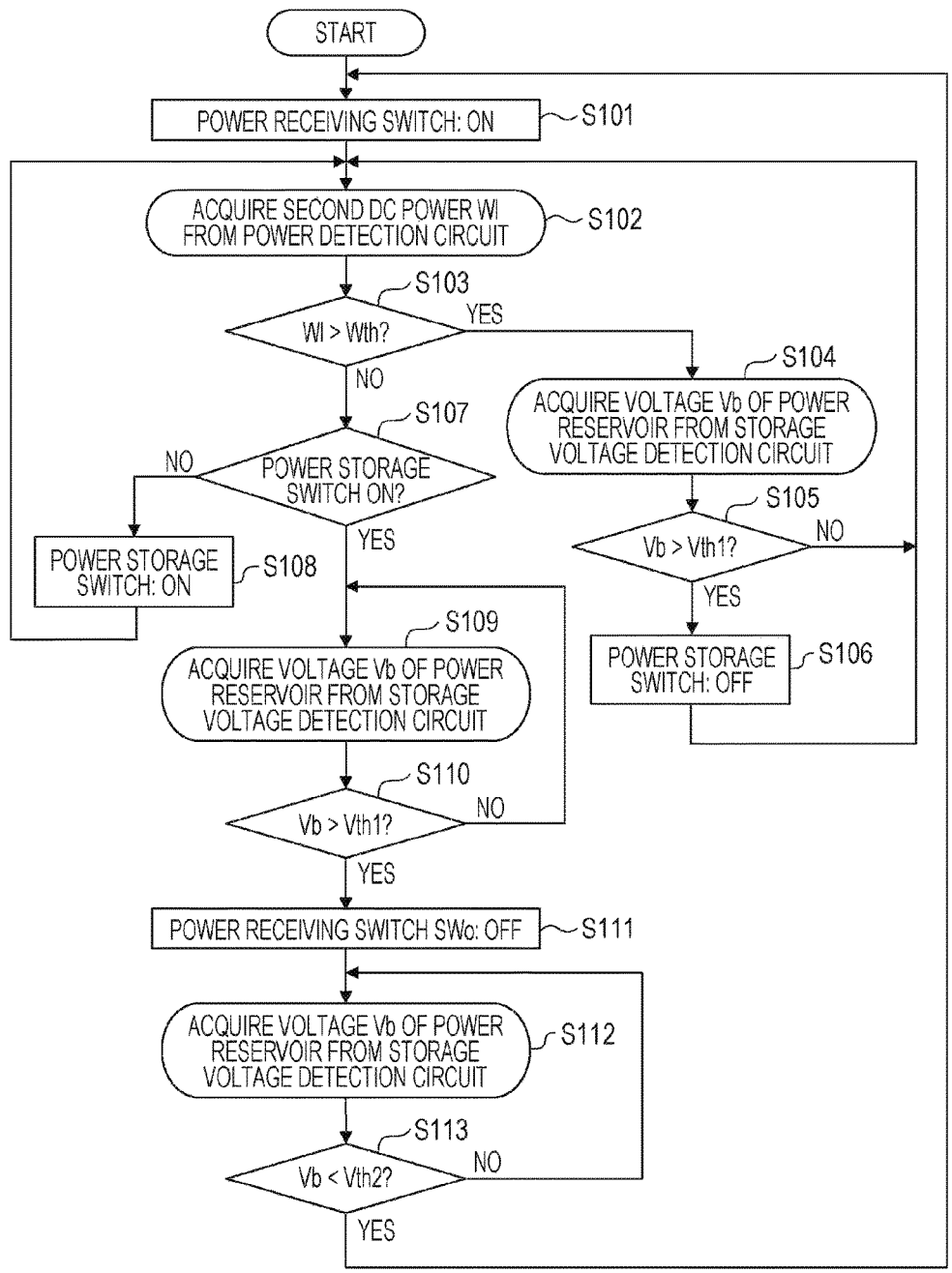
FIG. 12 is a flowchart illustrating an example of the power path switching operation performed by a power reception control circuit to drive a load.

FIG. 12 is a flowchart illustrating an example of the power path switching operation performed by the power reception control circuit 250 to drive the load. As illustrated in FIG. 6A, in this example, the switching circuit 240 includes the power storage switching circuit 240a and the power receiving switching circuit 240b. The power reception control circuit 250 turns ON the power receiving switching circuit 240b (a connected state) first (step S101). Thus, the power is supplied from the rectifier circuit 230 to the load 320. The power reception control circuit 250 acquires second DC power WI using the power detection circuit 260 (step S102). Thereafter, the power reception control circuit 250 determines whether the second DC power WI is greater than the power threshold value Wth (step S103). If WI>Wth, the power reception control circuit 250 acquires a voltage Vb of the battery 310 using the storage voltage detection circuit 270 (step S104). Thereafter, the power reception control circuit 250 determines whether the voltage Vb of the battery 310 is greater than a first voltage threshold value Vth1 (step S105). The first voltage threshold value Vth1 can be set to, for example, a value close to the voltage value when the battery 310 is fully charged. Let Vmax be the voltage when the battery 310 is fully charged. Then, Vth1 can be set to, for example, a value between 0.97Vmax and 0.99Vmax (inclusive). However, Vth1 is not limited to a value in this range. If Vb Vth1, it is determined that the charging is not sufficient and, thus, the processing returns to step S101. However, if Vb>Vth1, the power reception control circuit 250 determines that the battery 310 is almost full and, thus, turns OFF the power storage switching circuit 240a (a disconnected mode) (step S106). Thereafter, the processing returns to step S102. In this manner, the power supply from the rectifier circuit 230 to the battery 310 is stopped.

If, in step S103, WI≤Wth, the power reception control circuit 250 determines whether the power storage switching circuit 240a is ON (step S107). If the power storage switching circuit 240a is OFF, the power reception control circuit 250 turns ON the power storage switching circuit 240a (step S108). Thereafter, the processing returns to step S102. Thus, charging is started. If, in step S107, the power storage switching circuit 240a is ON, the power reception control circuit 250 acquires the voltage Vb of the battery 310 using the storage voltage detection circuit 270 (step S109). Subsequently, the power reception control circuit 250 determines whether the voltage Vb is greater than the first voltage threshold value Vth1 (step S110). If Vb≤Vth1, the power reception control circuit 250 determines that the charging is insufficient and, thus, the processing returns to step S109. However, if Vb>Vth1, the power reception control circuit 250 determines that the battery 310 is almost fully charged and turns OFF the power receiving switching circuit 240b (step S111). In this manner, power supply from the rectifier circuit 230 to the load 320 is stopped, and the power is supplied from the battery 310 to the load 320.

Subsequently, the power reception control circuit 250 acquires the voltage Vb of the battery 310 using the storage voltage detection circuit 270 (step S112). Thereafter, the power reception control circuit 250 determines whether the voltage Vb is lower than the second voltage threshold value Vth2 (step S113). The second voltage threshold value Vth2 is less than the first voltage threshold value Vth1. For example, the second voltage threshold value Vth2 can be set to a value greater than or equal to 0.94Vth1 and less than or equal to 0.97Vth1 (a value greater than or equal to 0.92Vmax and less than or equal to 0.96Vmax). However, the value of Vth2 is not limited to a value in this range. If Vb Vth2, the processing returns to step S112. If Vb<Vth2, the power reception control circuit 250 determines that the charge level of the battery 310 (the battery) is low. The processing returns to step S110, where the power reception control circuit 250 turns ON the power receiving switching circuit 240b.

Through the above-described operation, driving of the load 320 through the wireless power transmission under a low power condition can be avoided. In addition, an appropriate power supply and charging operation in accordance with the charge level of the battery 310 can be provided.

Figure 13:
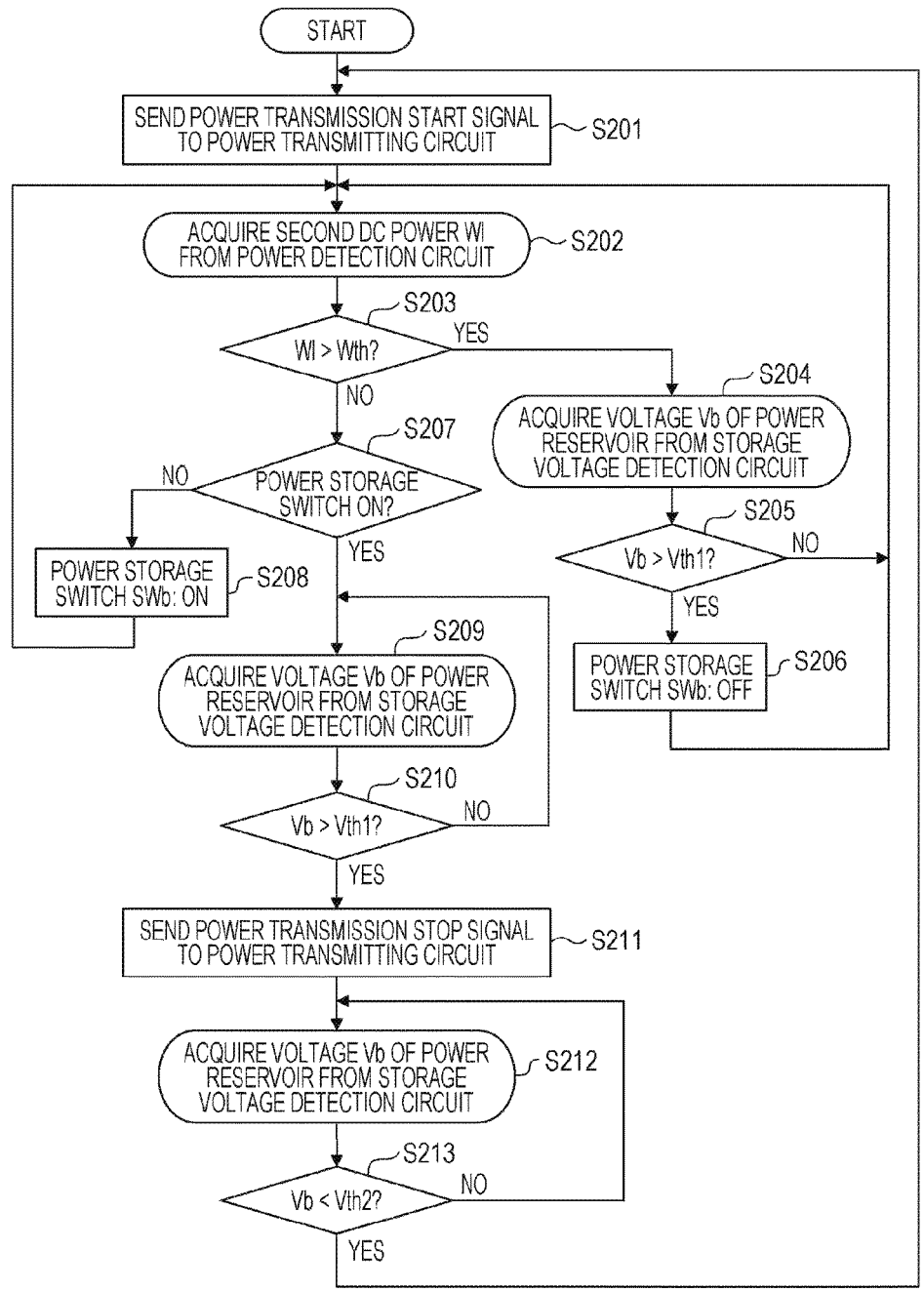
FIG. 13 is a flowchart illustrating another example of the power path switching operation performed by the power reception control circuit to drive a load.

FIG. 13 is a flowchart illustrating another example of the power path switching operation performed by the power reception control circuit 250 to drive the load. As illustrated in FIG. 6B, in this example, the switching circuit 240 includes the power storage switching circuit 240a. The power reception control circuit 250 requests the power transmitting circuit 120 of the power transmitting device 100 to start transmitting power (step S201). More specifically, the power reception control circuit 250 sends a power transmission start signal to the power transmitting device 100 via the power receiving-side transmitter 280. Upon receiving the power transmission start signal via the power transmitting-side receiver 180, the power transmission control circuit 150 of the power transmitting device 100 drives the inverter circuit 130 to start transmitting power. In this manner, the power is supplied from the rectifier circuit 230 to the load 320. The power reception control circuit 250 acquires the second DC power WI using the power detection circuit 260 (step S202). Thereafter, the power reception control circuit 250 determines whether the second DC power WI is greater than the power threshold value Wth (step S203). If WI>Wth, the power reception control circuit 250 acquires the voltage Vb of the battery 310 using the storage voltage detection circuit 270 (step S204). Subsequently, the power reception control circuit 250 determines whether the voltage Vb of the battery 310 is greater than the first voltage threshold value Vth1 (step S205). The first voltage threshold value Vth1 is set to a value close to the voltage value of the battery 310 when the battery 310 is almost full. If Vb≤Vth1, the power reception control circuit 250 determines that charging of the battery 310 is not sufficient and, thus, the processing returns to step S101. However, if Vb>Vth1, the power reception control circuit 250 determines that the battery 310 is almost full and, thus, switches OFF the power storage switching circuit 240a. Thereafter, the processing returns to step S102. In this manner, the power supply (charging) from the rectifier circuit 230 to the battery 310 is stopped.

If, in step S203, WI≤Wth, the power reception control circuit 250 determines whether the power storage switching circuit 240a is ON (step S207). If the power storage switching circuit 240a is OFF, the power storage switching circuit 240a is turned ON (step S208). Thereafter, the processing returns to step S202. In this manner, charging is started. If, in step S207, the power storage switching circuit 240a is ON, the power reception control circuit 250 acquires the voltage Vb of the battery 310 using the storage voltage detection circuit 270 (step S209). Thereafter, the power reception control circuit 250 determines whether the voltage Vb is greater than the first voltage threshold value Vth1 (step S210). If Vb≤Vth1, the power reception control circuit 250 determines that the charging is not sufficient and, thus, the processing returns to step S209. However, if Vb>Vth1, the power reception control circuit 250 determines that the battery 310 is almost full and sends the power transmission stop signal to the power transmission control circuit 150 of the power transmitting circuit 120 (step S211). In this manner, the power supply from the rectifier circuit 230 to the load 320 is stopped, and the power is supplied from the battery 310 to the load 320.

Subsequently, the power reception control circuit 250 acquires the voltage Vb of the battery 310 using the storage voltage detection circuit 270 (step S212). Thereafter, the power reception control circuit 250 determines whether the voltage Vb is greater than the second voltage threshold value Vth2 (step S213). If Vb≥Vth2, the processing returns to step S212. However, if Vb<Vth2, the power reception control circuit 250 determines that the charge level of the battery 310 (the battery) decreases. The processing returns to step S210, where the power reception control circuit 250 sends a power transmission start signal to the power transmitting circuit 120.

Through the above-described operation, driving of the load 320 through the wireless power transmission under a low power condition can be avoided. In addition, an appropriate power supply and charging operation in accordance with the charge level of the battery 310 can be provided.

Figure 14:
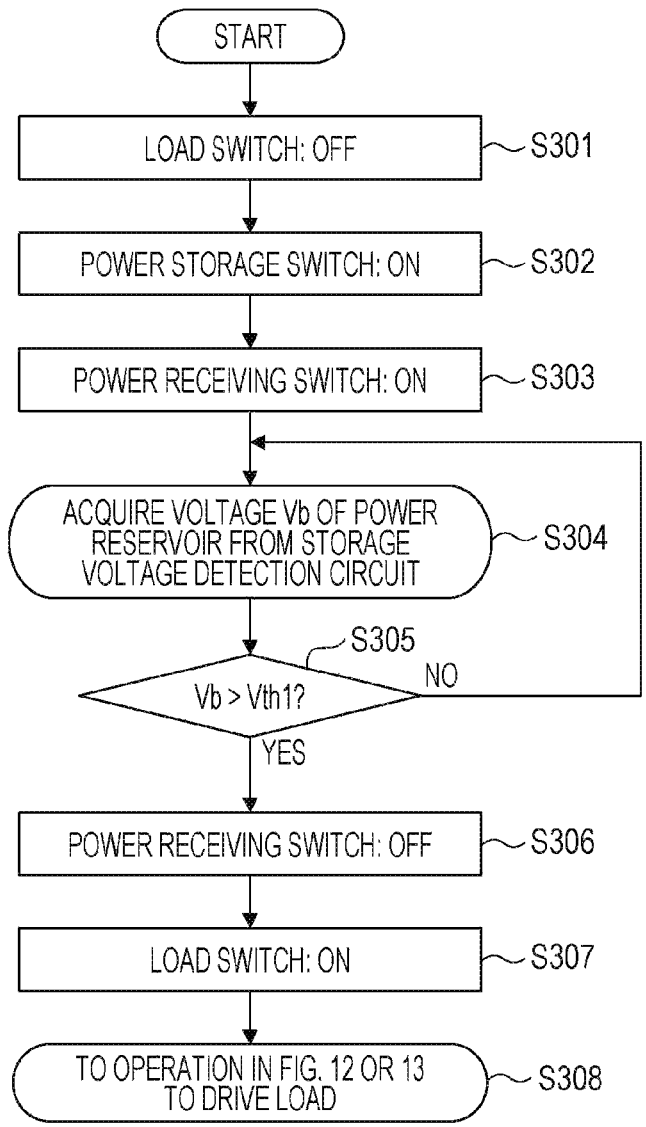
FIG. 14 is a flowchart of an example of a charging process performed by the power reception control circuit when power supply to a load is stopped.

FIG. 14 is a flowchart of an example of a charging process performed by the power reception control circuit 250 when power supply to the load 420 is stopped. As illustrated in FIG. 6C, in this example, the switching circuit 240 includes the power storage switching circuit 240a, the power receiving switching circuit 240b, and the load switching circuit 240c. The power reception control circuit 250 turns OFF the load switching circuit 240c, turns ON the power storage switching circuit 240a, and turns ON the power receiving switching circuit 240b first (steps S301 to S303). In this manner, the power supply to the load 420 is stopped, and only charging of the battery 310 is performed.

The power reception control circuit 250 acquires the voltage Vb of the battery 310 using the storage voltage detection circuit 270 (step S304). Thereafter, the power reception control circuit 250 determines whether the voltage Vb of the battery 310 is greater than the first voltage threshold value Vth1 (step S305). If Vb≤Vth1, the power reception control circuit 250 determines that the charging is not sufficient and, thus, the processing returns to step S304. However, if Vb>Vth1, the power reception control circuit 250 determines that the battery 310 is almost full and switches OFF the power receiving switching circuit 240b (step S306). In this manner, the charging is stopped. Thereafter, the power reception control circuit 250 turns ON the load switching circuit 240c (step S307). Thus, power supply from the battery 310 to the load 320 is started. Subsequently, the operation illustrated in FIG. 12 or 13 is performed to drive the load (step S308). Note that in step S306, the power storage switching circuit 240a may be turned OFF instead of turning OFF the power receiving switching circuit 240b. In such a case, if the load switching circuit 240c is turned ON in step S307, power supply from the rectifier circuit 230 to the load 320 is started.

Figure 15:
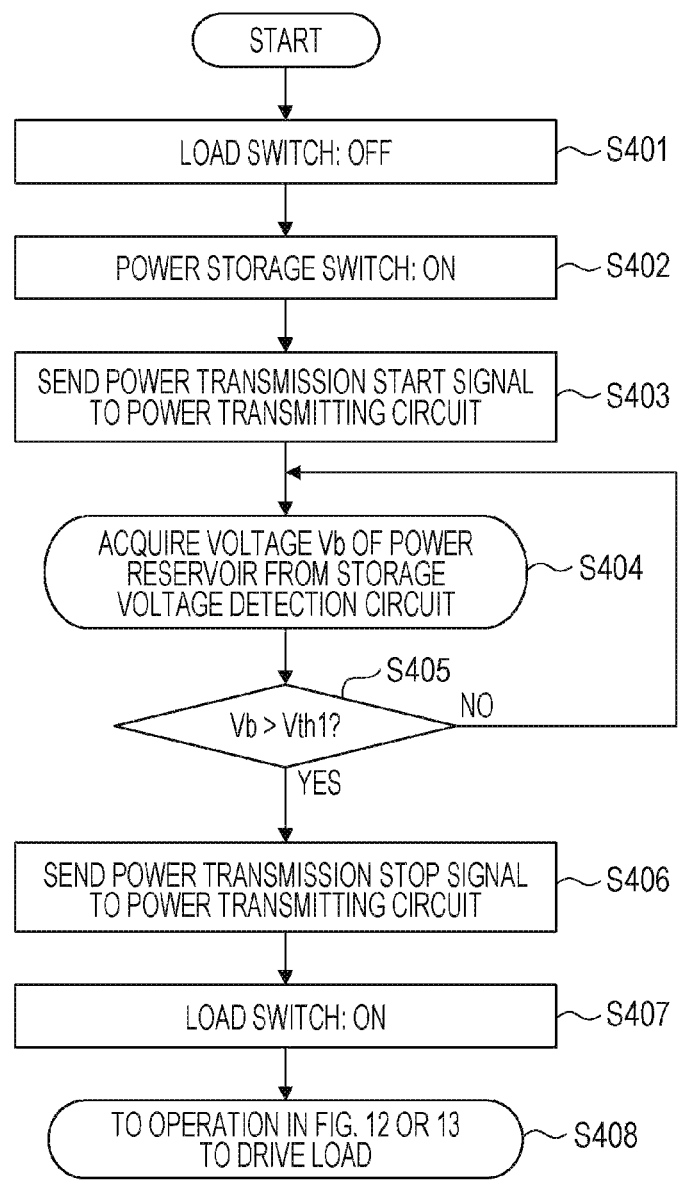
FIG. 15 is a flowchart of another example of the charging process performed by the power reception control circuit when power supply to the load is stopped.

FIG. 15 a flowchart of another example of a charging process performed by the power reception control circuit 250 when power supply to the load 420 is stopped. As illustrated in FIG. 6D, in this example, the switching circuit 240 includes the power storage switching circuit 240a and the load switching circuit 240c. The power reception control circuit 250 turns OFF the load switching circuit 240c and turns ON the power storage switching circuit 240a first (steps S401 and S402). Thereafter, the power reception control circuit 250 sends a power transmission start signal to the power transmitting circuit 120 (step S403). In this manner, power supply to the load 420 is stopped, and only charging of the battery 310 is performed.

The power reception control circuit 250 acquires the voltage Vb of the battery 310 using the storage voltage detection circuit 270 (step S404). Thereafter, the power reception control circuit 250 determines whether the voltage Vb of the battery 310 is greater than the first voltage threshold value Vth1 (step S405). If Vb≤Vth1, the power reception control circuit 250 determines that charging of the battery 310 is not sufficient and, thus, the processing returns to step S404. However, if Vb>Vth1, the power reception control circuit 250 determines that the battery 310 is almost full and sends a power transmission stop signal to the power transmitting circuit 120 (step S406). In this manner, the charging is stopped. Thereafter, the power reception control circuit 250 turns ON the load switching circuit 240c (step S407). In this manner, power supply from the battery 310 to the load 320 is started. Subsequently, the operation illustrated in FIG. 12 or 13 is performed to drive the load (step S408).

Through the above-described operation, under a low load condition under which the transmitting efficiency of the wireless power transmission decreases, the load is driven by the battery. The power supply through the wireless power transmission is performed only under a load condition of a value greater than or equal to a predetermined value that increases the efficiency. In this manner, the power efficiency per time unit can be increased. In addition, according to the present exemplary embodiment, the points in time at which charging and discharging are performed are appropriately controlled in accordance with the charge level of the battery. Accordingly, the power can be stably supplied to the load while preventing a decrease in the transmitting efficiency.

As described above, the present disclosure provides wireless power transmission systems having the configurations described below.

Configuration 1

A power receiving device, comprising:
a power receiving antenna that receives AC power from a power transmitting device including a power transmitting antenna that wirelessly transmits the AC power;
a rectifier circuit that converts the AC power into DC power;
a detection circuit that detects a value of the DC power;
a load that is driven by the DC power;
a battery that charges the DC power;
a switching circuit that provides i) connection and disconnection between the rectifier circuit and the load and ii) connection and disconnection between the load and the battery; and
a control circuit that controls the power receiving device,
wherein the control circuit controls the switching circuit to connect the rectifier circuit to the load and disconnect the rectifier circuit from the battery and determines whether the value of the DC power detected using the detection circuit is less than or equal to a power threshold value,
wherein if the value of the DC power reaches less than or equal to the power threshold value, the control circuit controls the switching circuit to disconnect the rectifier circuit from the load and connect the load to the battery to drive the load using the DC power charged by the battery.

Configuration 2

A power receiving device, comprising:

a power receiving antenna that receives AC power from a power transmitting device including a power transmitting antenna that wirelessly transmits the AC power;

a rectifier circuit that converts the AC power into DC power;

a first detection circuit that detects a value of the DC power;

a load that is driven by the DC power;

a battery that charges the DC power;

a second detection circuit that detects a charge level of the battery;

a switching circuit that provides i) connection and disconnection between the rectifier circuit and the load, ii) connection and disconnection between the rectifier circuit and the battery, and iii) connection and disconnection between the load and the battery; and a control circuit that controls the power receiving device, wherein the control circuit controls the switching circuit to connect the rectifier circuit to the load, disconnect the rectifier circuit from the battery, and disconnect the load from the battery, wherein the control circuits determines whether the value of the DC power detected using the first detection circuit is less than or equal to a power threshold value, wherein if the value of the DC power reaches less than or equal to the power threshold value, the control circuit controls the switching circuit to connect the rectifier circuit to the load, connect the rectifier circuit to the battery, and connect the load to the battery, wherein if the charge level of the battery is greater than or equal to a first charge level threshold value, the control circuit controls the switching circuit to disconnect the rectifier circuit from the load, disconnect the rectifier circuit from the battery, and connect the load to the battery, and drives the load by the DC power charged in the battery.

Configuration 3

In the power receiving device according to Configuration 2, if the charge level of the battery is not greater than or equal to the first charge level threshold value, the control circuit controls the switching circuit to disconnect the rectifier circuit from the load, connect the rectifier circuit to the battery, and disconnect the load from the battery, and charge the battery by the DC power from the rectifier circuit.

Configuration 4

In the power receiving device according to Configuration 2, if the charge level of the battery is not greater than or equal to the first charge level threshold value, the control circuit controls the switching circuit to connect the rectifier circuit to the load and connect the rectifier circuit to the battery, and causes the battery to charge by the DC power from the rectifier circuit.

Configuration 5

In the power receiving device according to Configuration 2, if the charge level of the battery reaches a value less than or equal to a second charge level threshold value after supply of the DC power from the battery to the load is started, the control circuit controls the switching circuit to connect the rectifier circuit to the load and connect the rectifier circuit to the battery to supply the DC power from the rectifier circuit to the load, and charges the battery with the DC power from the rectifier circuit.

Configuration 6

In the power receiving device according to Configuration 5, the second charge level threshold value is less than or equal to the first charge level threshold value.

Configuration 7

A power receiving device, comprising:

a power receiving antenna that receives AC power from a power transmitting device including a power transmitting antenna that wirelessly transmits the AC power;

a rectifier circuit that converts the AC power into DC power;

a detection circuit that detects a value of the DC power;

a load that is driven by the DC power;

a battery that charges the DC power;

a switching circuit that provides connection and disconnection between the load and the battery; and a control circuit controls the switching circuit to disconnect the load from the battery to supply the DC power from the rectifier circuit to the load and determines whether a value of the DC power detected using the detection circuit is less than or equal to a threshold value, wherein if the value of the DC power reaches a value less than or equal to the threshold value, the control circuit controls the switching circuit to connect the load to the battery, and wherein the control circuit transmits, to the power transmitting device, a power transmission stop signal to stop transmission of the AC power from the power transmitting device to the power receiving device, and drive the battery by the DC power charged in the battery.

Configuration 8

A power receiving device includes a power receiving antenna that receives AC power from a power transmitting device including a power transmitting antenna that wirelessly transmits the AC power;

a rectifier circuit that converts the AC power into DC power, a first detection circuit that detects a value of the DC power, a load that is driven by the DC power, a battery that charges the DC power, a second detection circuit that detects a charge level of the battery, a switching circuit that provides connection and disconnection between the load and the battery, and a control circuit that controls the power receiving device.

The control circuit controls the switching circuit to disconnect the load from the battery to supply the DC power from the rectifier circuit to the load and determines whether the value of the DC power detected using the first detection circuit is less than or equal to a threshold value in the mode.

If the value of the DC power reaches a value less than or equal to the threshold value, the control circuit controls the switching circuit to connect to the battery, and the control circuit transmits, to the power transmitting device, a power transmission stop signal to stop transmission of the AC power from the power transmitting device to the power receiving device.

If the battery has a charge level greater than or equal to a predetermined value, the load is driven by the DC power charged in the battery.

Configuration 9

A power receiving device includes a power receiving antenna that receives AC power from a power transmitting device including a power transmitting antenna that wirelessly transmits the AC power;

a rectifier circuit that converts the AC power into DC power, a first detection circuit that detects a value of the DC power, a load that is driven by the DC power, a battery that charges the DC power, a second detection circuit that detects a charge level of the battery, a switching circuit that provides connection and disconnection between the load and the battery, and a control circuit that controls the power receiving device.

The control circuit controls the switching circuit to disconnect the load from the battery to supply the DC power from the rectifier circuit to the load and determines whether the value of the DC power detected using the first detection circuit is less than or equal to a threshold value in the mode.

If the value of the DC power reaches a value less than or equal to the threshold value, the control circuit determines that the AC power that is greater than or equal to a predetermined value is not required for driving the load.

If the battery has a charge level greater than or equal to a predetermined value, the control circuit controls the switching circuit to connect the load to the battery, and the control circuit transmits, to the power transmitting device, a power transmission stop signal to stop transmission of the AC power from the power transmitting device to the power receiving device, and drive the load by the DC power charged in the battery.

Configuration 10

In the power receiving device according to any one of Configurations 1 to 9, the load includes a motor.

Configuration 11

In the power receiving device according to Configuration 10, the condition that the AC power that is greater than or equal to a predetermined value is not required for driving the load includes a condition that a variation of a rotational speed of the motor is within a predetermined range for a predetermined period of time.

Configuration 12

In the power receiving device according to Configuration 10, the condition that the AC power that is greater than or equal to a predetermined value is not required for driving the load includes a condition that the motor is maintained in a stopped condition.

The technology according to the present disclosure is applicable to electronic devices that require power to be wirelessly transmitted, such as electric vehicles, security cameras, and robots.

What is claimed is:

1. A power receiving device, comprising:
a power receiving antenna that receives AC power from a power transmitting device including a power transmitting antenna that wirelessly transmits the AC power;
a rectifier circuit that converts the AC power into DC power;
a detection circuit that detects a value of the DC power during a time that the power receiving antenna receives the AC power from the power transmitting device;
a load that is driven by the DC power;
a battery that charges the DC power;
a switching circuit that provides i) connection and disconnection between the rectifier circuit and the load and ii) connection and disconnection between the load and the battery; and
a control circuit that controls the power receiving device, the control circuit being configured to control the switching circuit as a function of the value of the DC power detected using the detection circuit,
wherein the control circuit controls the switching circuit to connect the rectifier circuit to the load and disconnect the rectifier circuit from the battery and determines whether the value of the DC power detected using the detection circuit is less than or equal to a power threshold value, and
in response to the value of the DC power reaching less than or equal to the power threshold value, the control circuit controls the switching circuit to disconnect the rectifier circuit from the load and connect the load to the battery to drive the load using the DC power charged by the battery.

2. A power receiving device, comprising:
a power receiving antenna that receives AC power from a power transmitting device including a power transmitting antenna that wirelessly transmits the AC power;
a rectifier circuit that converts the AC power into DC power;
a first detection circuit that detects a value of the DC power during a time that the power receiving antenna receives the AC power from the power transmitting device;
a load that is driven by the DC power;
a battery that charges the DC power;
a second detection circuit that detects a charge level of the battery;
a switching circuit that provides i) connection and disconnection between the rectifier circuit and the load, ii) connection and disconnection between the rectifier circuit and the battery, and iii) connection and disconnection between the load and the battery; and
a control circuit that controls the power receiving device, the control circuit being configured to control the switching circuit as a function of the value of the DC power detected using the first detection circuit and the charge level detected using the second detection circuit,
wherein the control circuit controls the switching circuit to connect the rectifier circuit to the load, disconnect the rectifier circuit from the battery, and disconnect the load from the battery, and
wherein in response to the value of the DC power reaching less than or equal to the power threshold value, the control circuit controls the switching circuit to connect the rectifier circuit to the load, connect the rectifier circuit to the battery, and connect the load to the battery,
wherein in response to the charge level of the battery being greater than or equal to a first charge level threshold value, the control circuit controls the switching circuit to disconnect the rectifier circuit from the load, disconnect the rectifier circuit from the battery, and connect the load to the battery, and drives the load by the DC power charged in the battery.

3. The power receiving device according to claim 2, wherein in response to the charge level of the battery being not greater than or equal to the first charge level threshold value, the control circuit controls the switching circuit to disconnect the rectifier circuit from the load, connect the rectifier circuit to the battery, and disconnect the load from the battery, and charge the battery by the DC power from the rectifier circuit.

4. The power receiving device according to claim 2, wherein in response to the charge level of the battery being not greater than or equal to the first charge level threshold value, the control circuit controls the switching circuit to connect the rectifier circuit to the load and connect the rectifier circuit to the battery, and causes the battery to charge by the DC power from the rectifier circuit.

5. The power receiving device according to claim 2, wherein in response to the charge level of the battery reaching less than or equal to a second charge level threshold value after supplying of the DC power from the battery to the load, the control circuit controls the switching circuit to connect the rectifier circuit to the load and connect the rectifier circuit to the battery to supply the DC power from the rectifier circuit to the load, and charges the battery with the DC power from the rectifier circuit.

6. The power receiving device according to claim 5, wherein the second charge level threshold value is less than or equal to the first charge level threshold value.

7. A power receiving device, comprising:
- a power receiving antenna that receives AC power from a power transmitting device including a power transmitting antenna that wirelessly transmits the AC power;
- a rectifier circuit that converts the AC power into DC power;
- a detection circuit that detects a value of the DC power during a time that the power receiving antenna receives the AC power from the power transmitting device;
- a load that is driven by the DC power;
- a battery that charges the DC power;
- a switching circuit that provides connection and disconnection between the load and the battery; and
- a control circuit configured to control the switching circuit as a function of the value of the DC power detected using the detection circuit, the control circuit controlling the switching circuit to disconnect the load from the battery to supply the DC power from the rectifier circuit to the load and determining whether a value of the DC power detected using the detection circuit is less than or equal to a threshold value, in response to the value of the DC power reaching a value less than or equal to the threshold value, the control circuit controls the switching circuit to connect the load to the battery, and wherein the control circuit transmits, to the power transmitting device, a power transmission stop signal to stop transmission of the AC power from the power transmitting device to the power receiving device, and drive the load by the DC power charged in the battery.

* * * * *